United States Patent [19]
Clark et al.

[11] Patent Number: 5,221,656
[45] Date of Patent: Jun. 22, 1993

[54] HYDROPROCESSING CATALYST

[75] Inventors: Frederick T. Clark, Wheaton, Ill.; Albert L. Hensley, Jr., Munster, Ind.; Simon G. Kukes, Naperville; David C. Arters, Brookfield, both of Ill.

[73] Assignee: Amoco Corporation, Chicago, Ill.

[21] Appl. No.: 857,336

[22] Filed: Mar. 25, 1992

[51] Int. Cl.⁵ .......................... B01J 23/85; B01J 23/88
[52] U.S. Cl. ................................. 502/315; 502/305; 502/313; 502/316; 502/319; 502/321; 502/325; 502/337; 502/338; 502/339
[58] Field of Search ............... 502/313, 314, 315, 316, 502/305, 319, 321, 325, 337, 338, 339

[56] References Cited
U.S. PATENT DOCUMENTS

| | | | |
|---|---|---|---|
| 4,395,329 | 7/1983 | Le Page et al. | 502/313 X |
| 4,454,026 | 6/1984 | Hensley et al. | 502/322 X |
| 4,908,344 | 3/1990 | Pereira et al. | 502/313 |

Primary Examiner—W. J. Shine
Attorney, Agent, or Firm—Thomas A. Yassen; Richard A. Kretchmer; Frank J. Sroka

[57] ABSTRACT

A hydroprocessing catalyst and process of using such catalyst wherein such catalyst has at least one hydrogenation metal deposited on an inorganic oxide support and is further characterized by a surface area of greater than about 220 m²/g, a pore volume of about 0.23–0.30 cc/g in pores greater than about 600 Angstroms radius, an average pore radius of about 30–70 Angstroms in pores less than 600 Angstroms, and an incremental pore volume curve with a maximum at about 25–50 Angstroms radius.

10 Claims, 18 Drawing Sheets

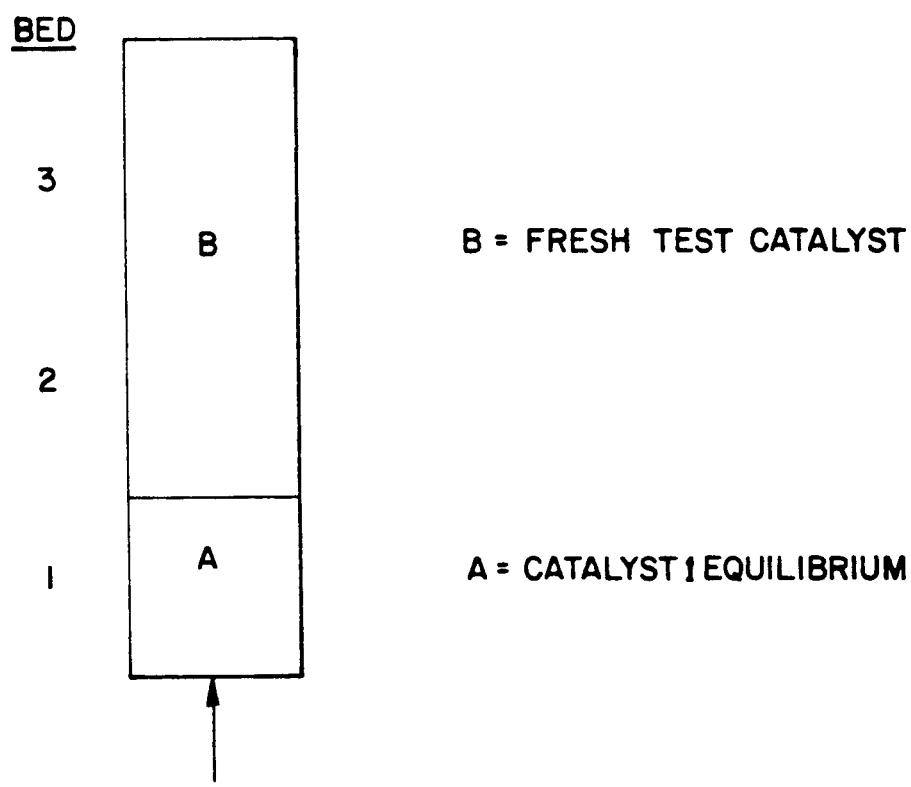

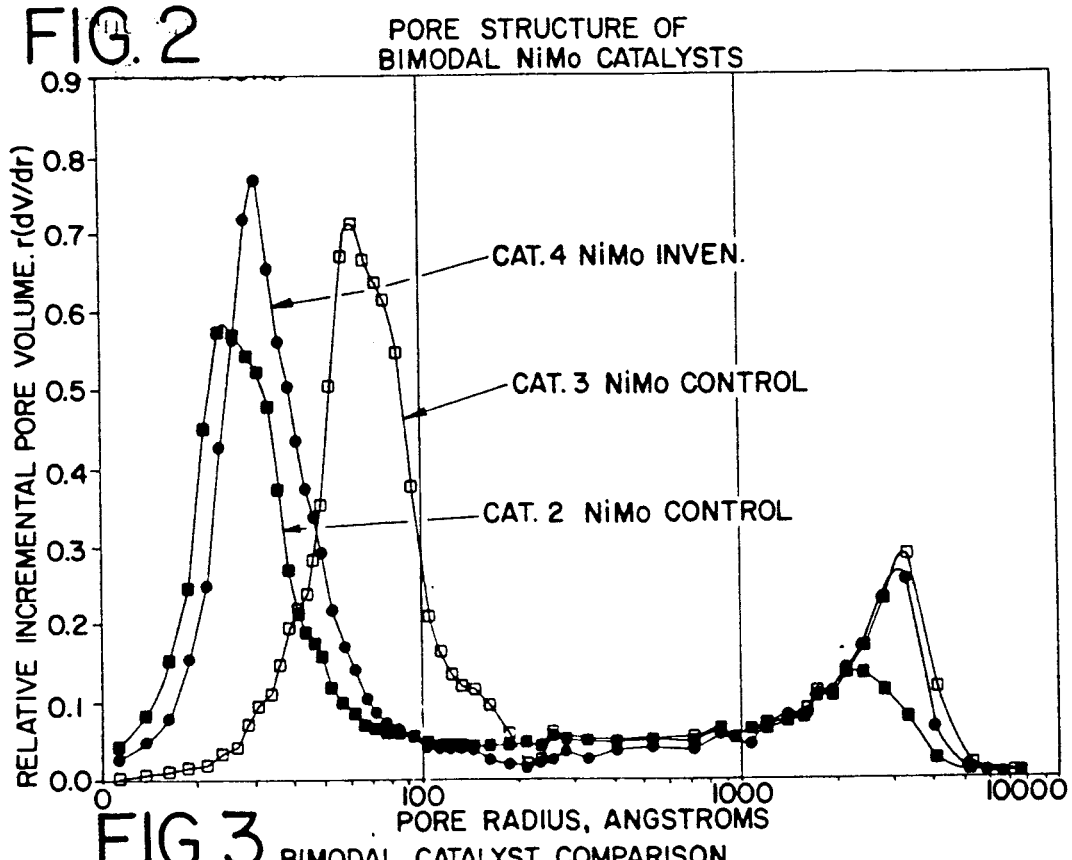
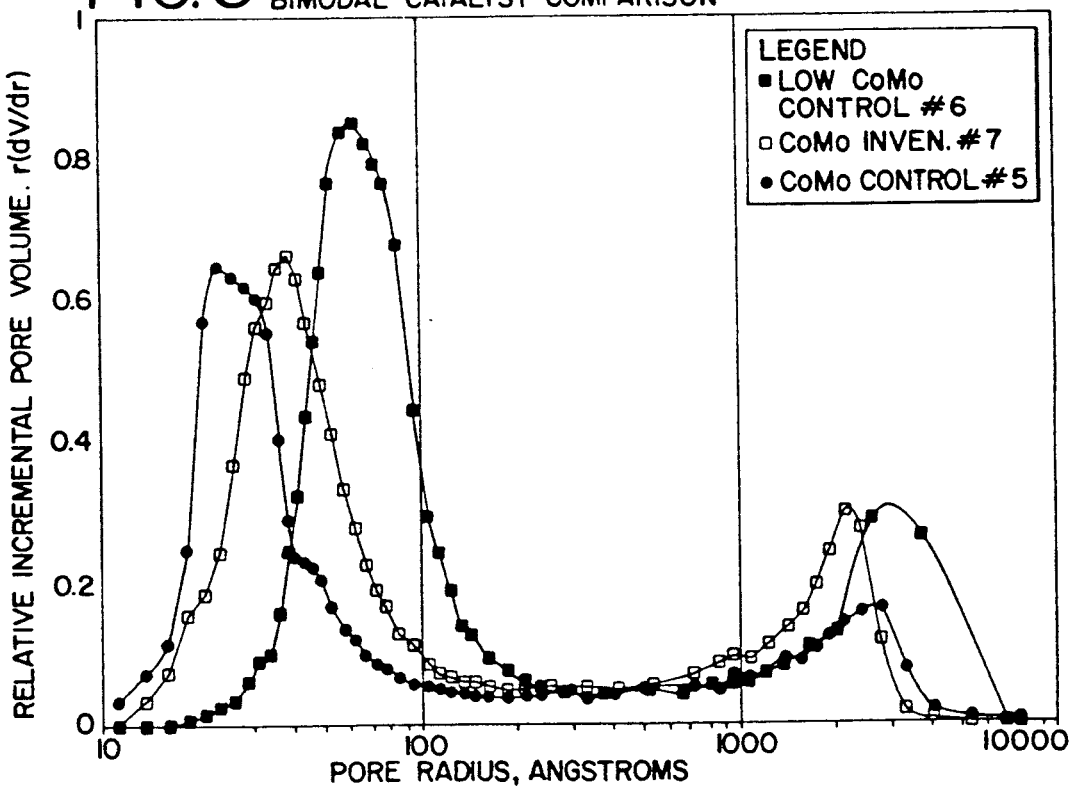

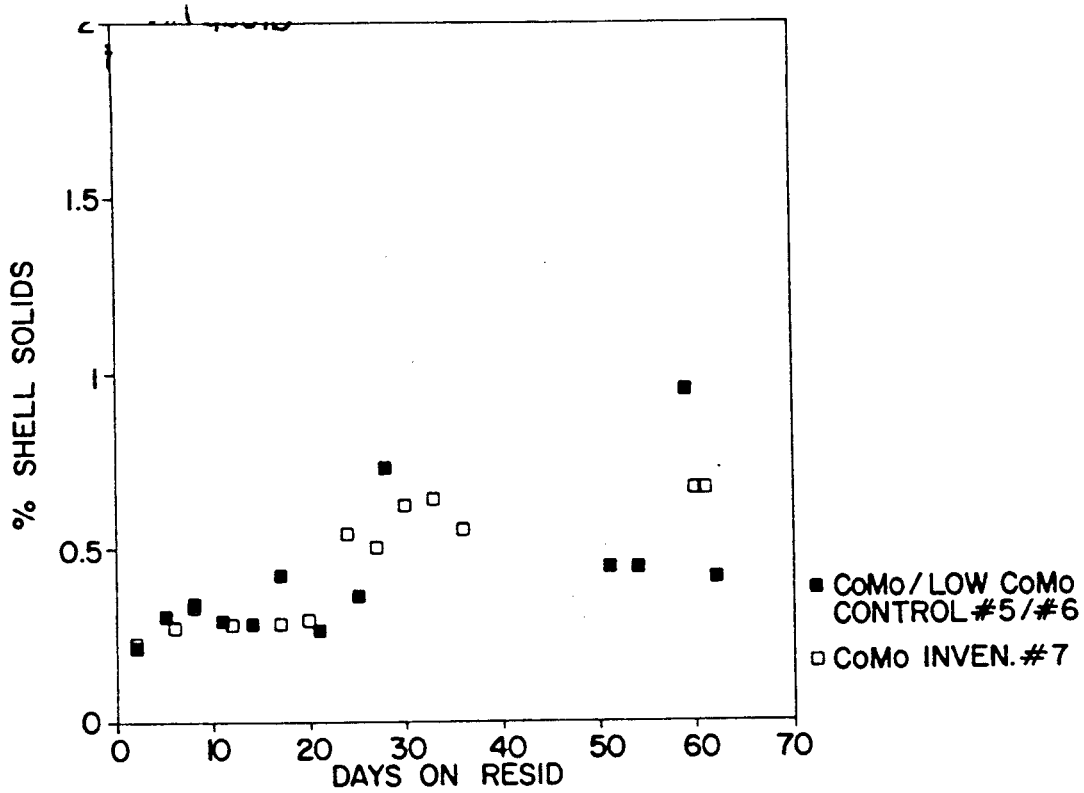
FIG. 6 SHELL SOLIDS WITH FEED A (20 VOL% MAYA)
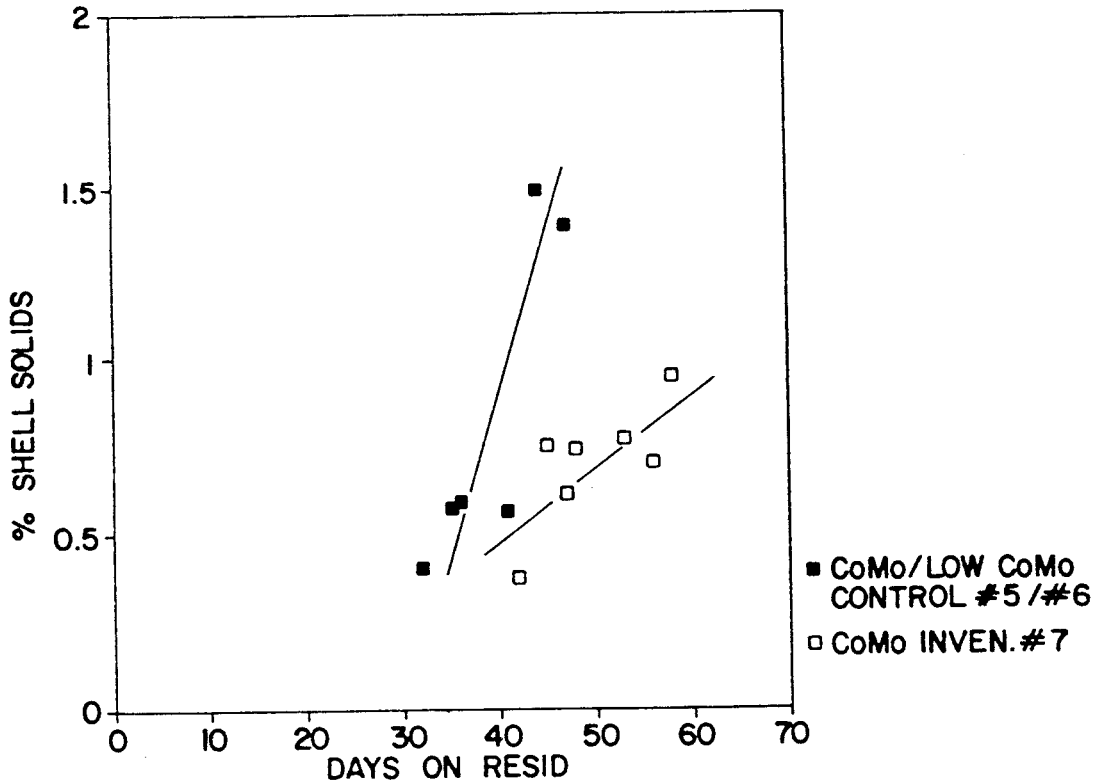
FIG. 7 SHELL SOLIDS WITH FEED B (35 VOL% MAYA)

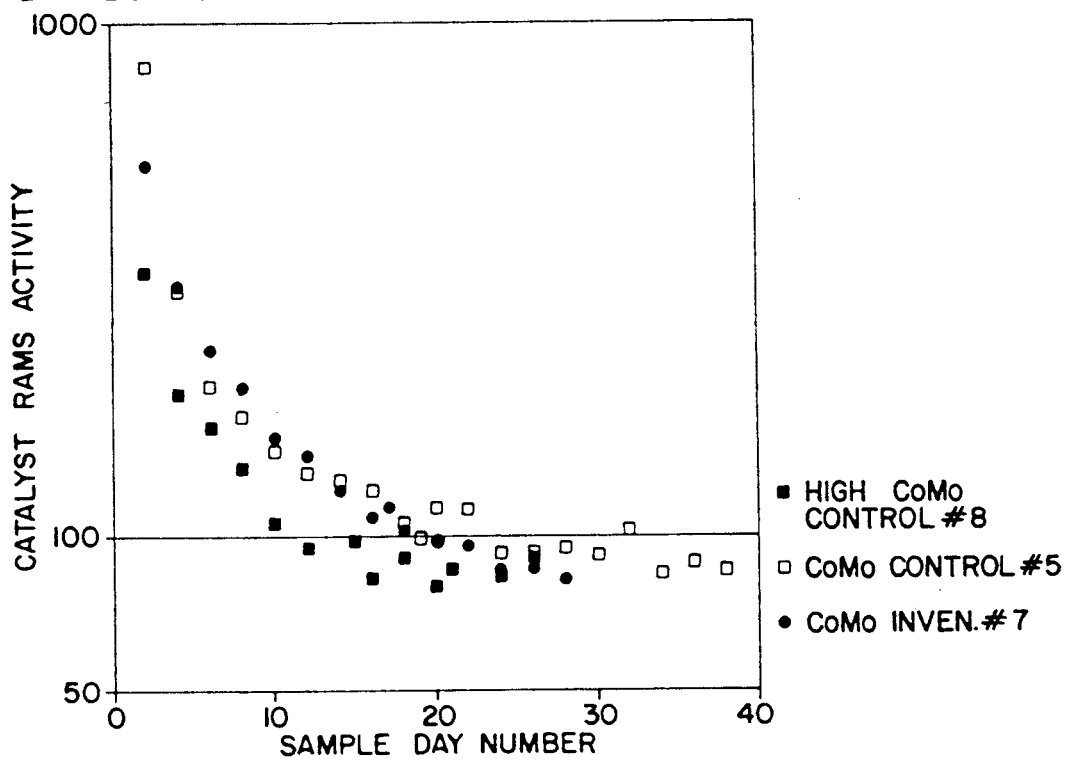
FIG. 10 RAMS ACTIVITY -- COMO CATALYSTS
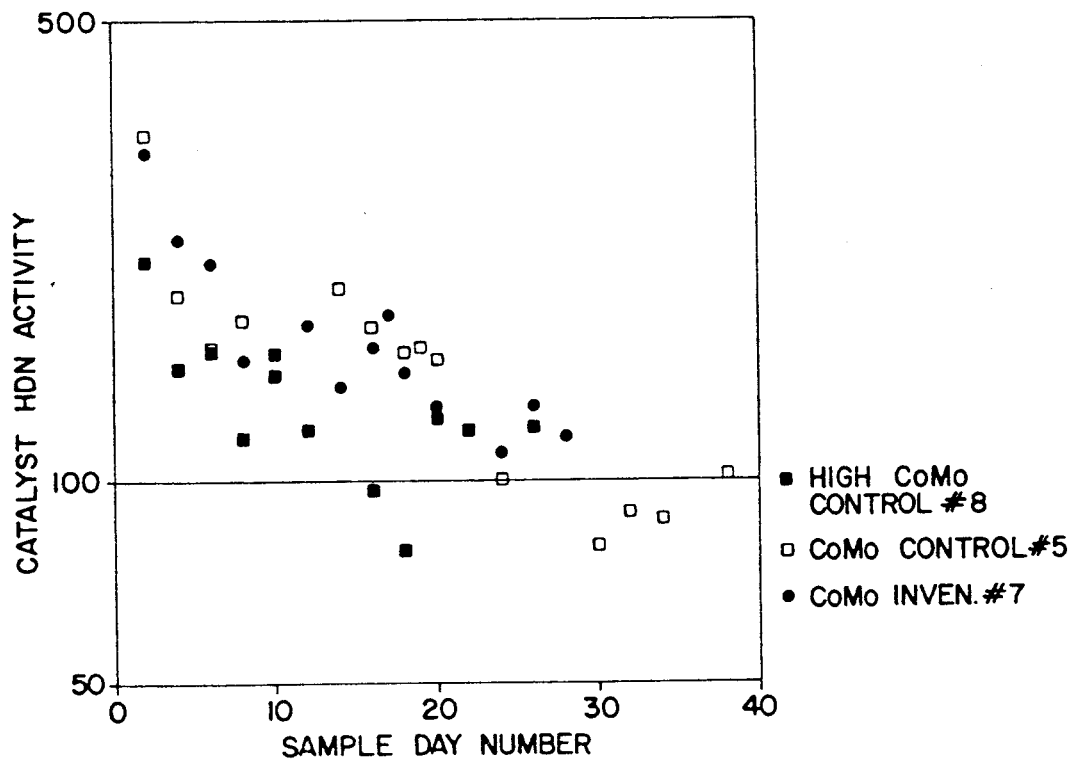
FIG. 11 HDN ACTIVITY -- COMO CATALYSTS

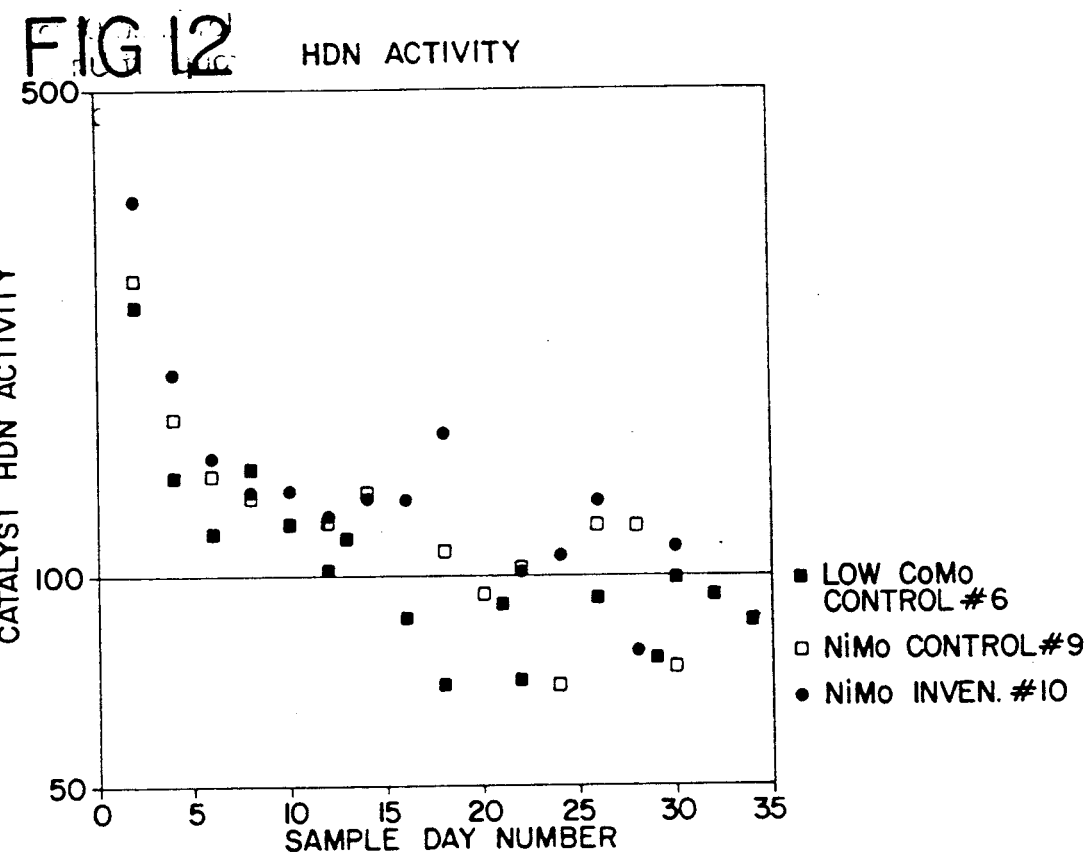
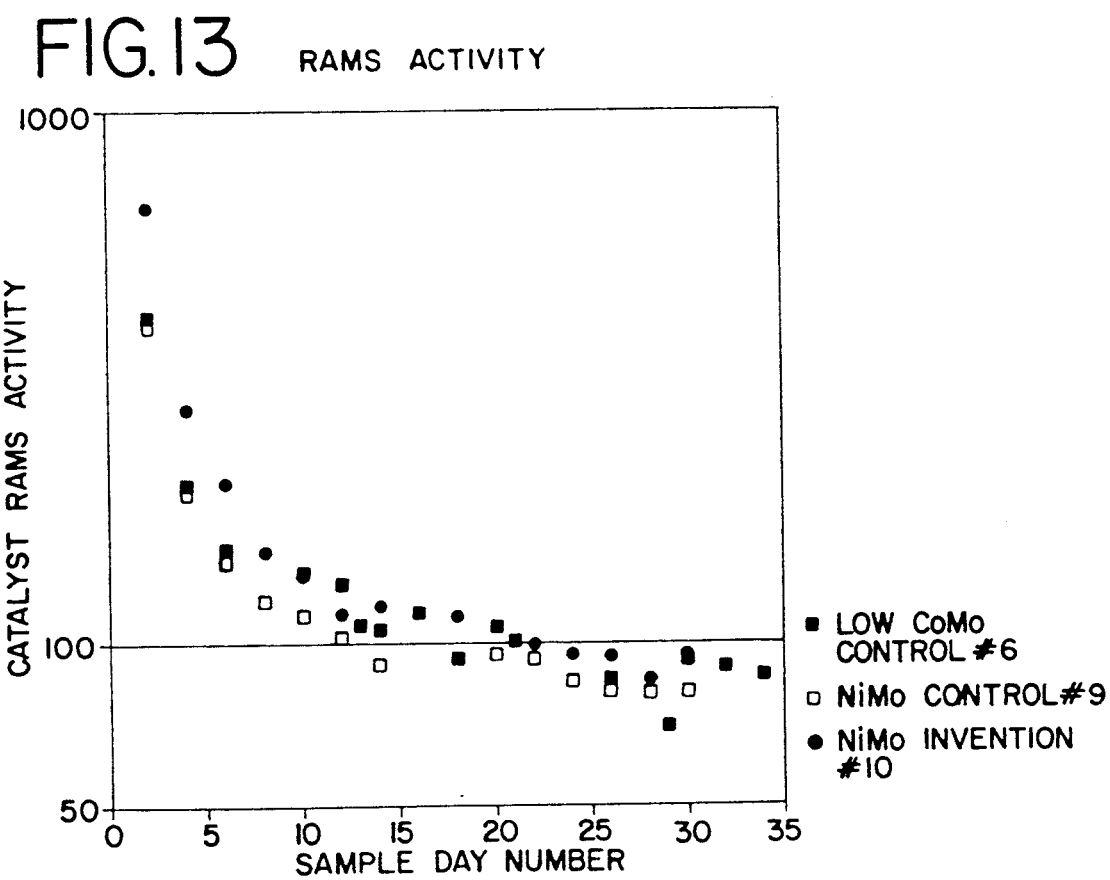

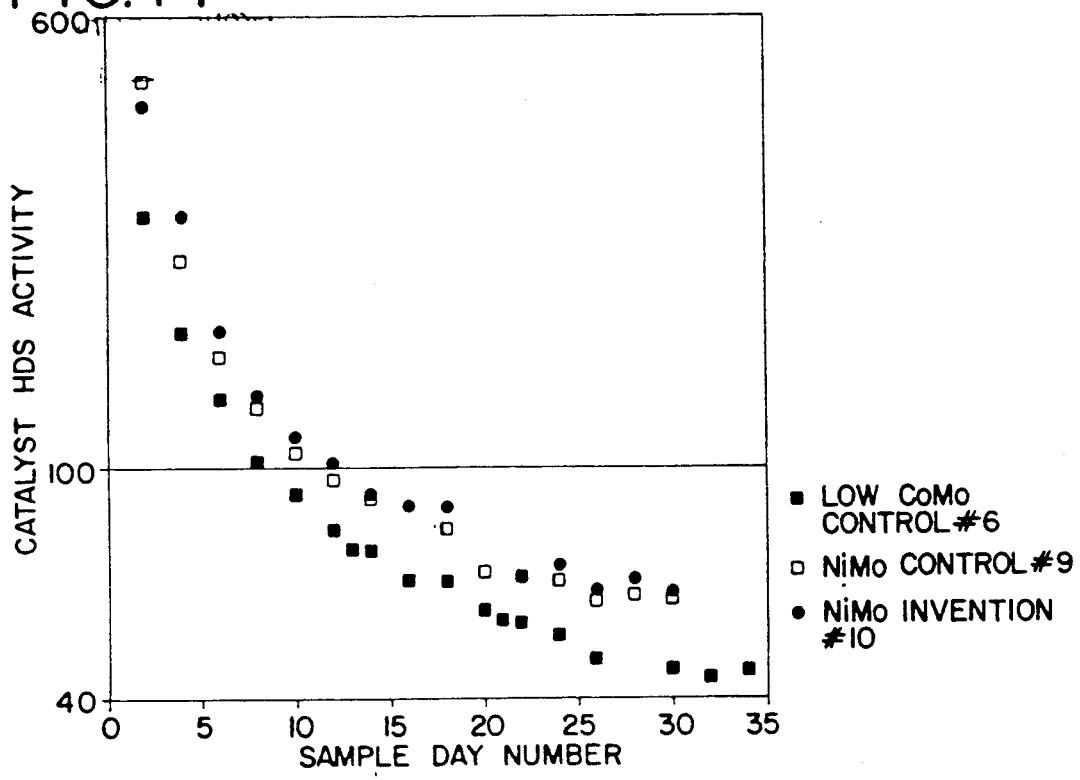
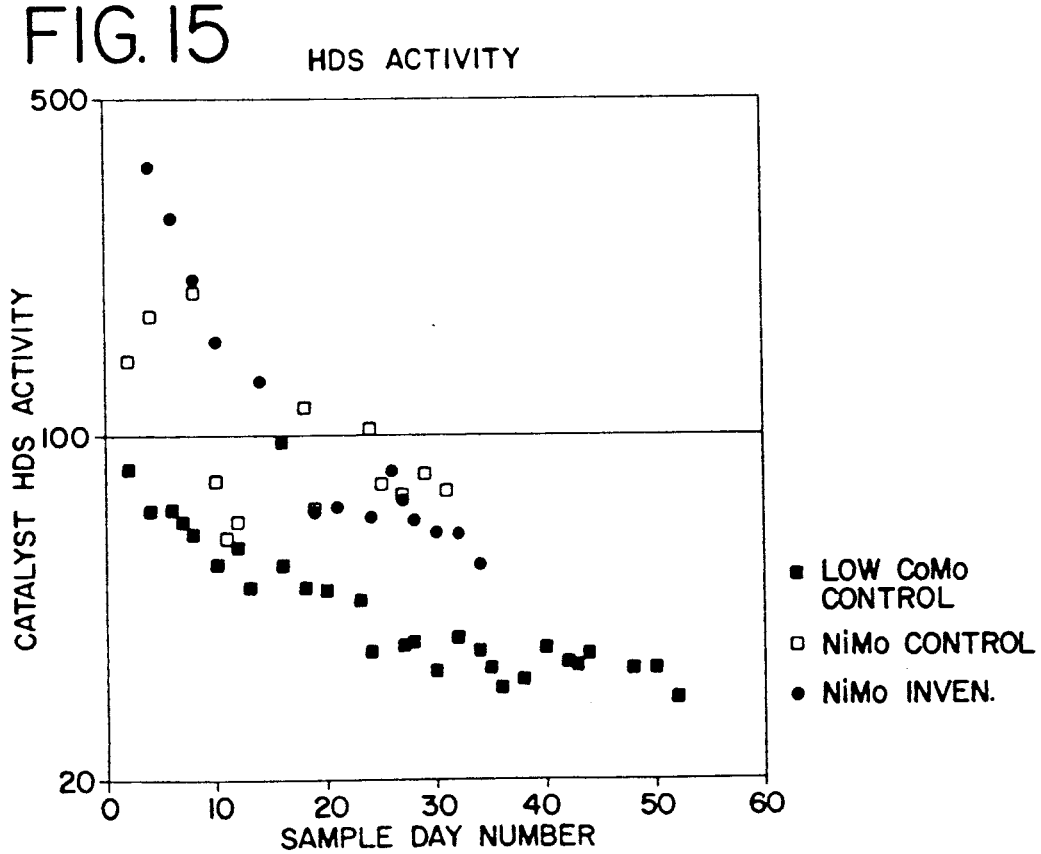

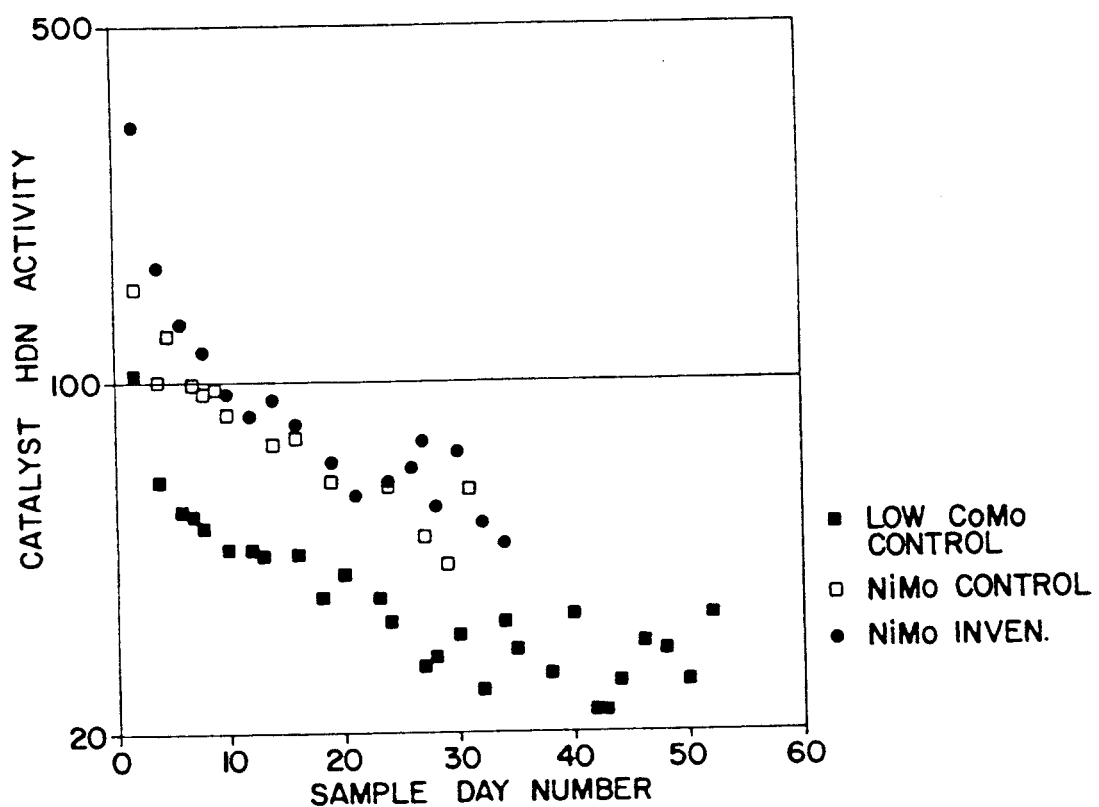

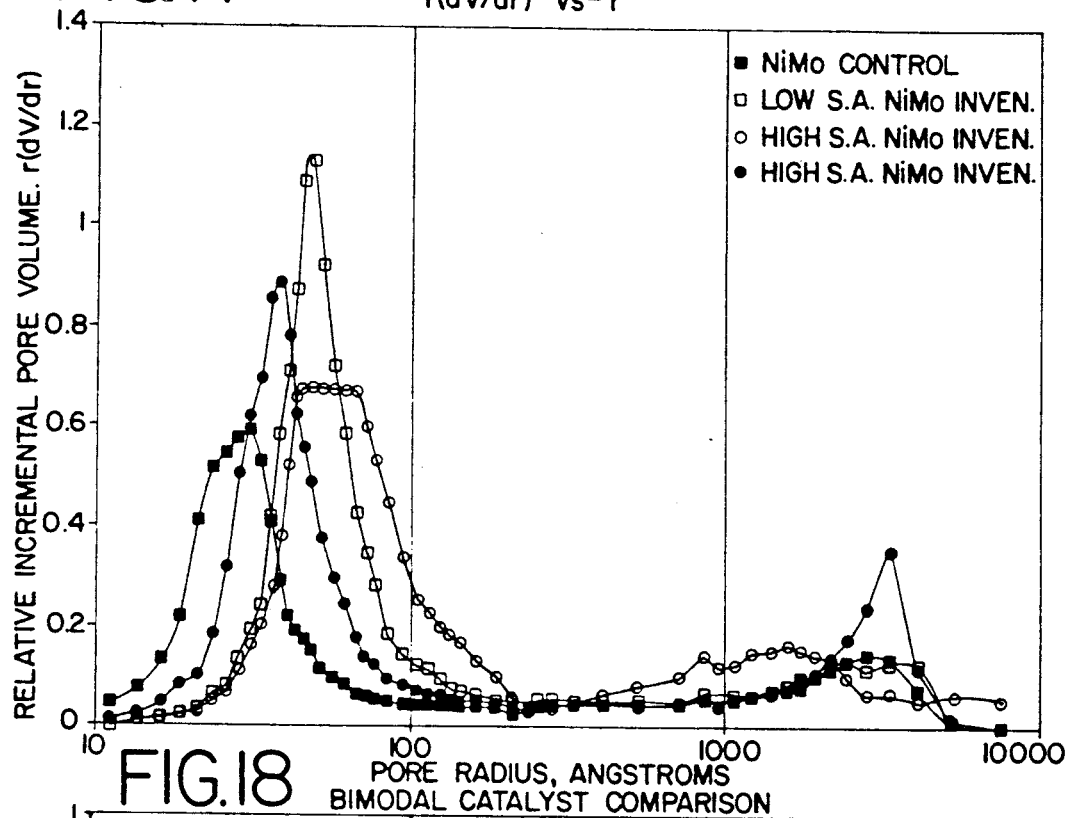
FIG. 17 PORE SIZE DISTRIBUTION r(dV/dr)-vs-r
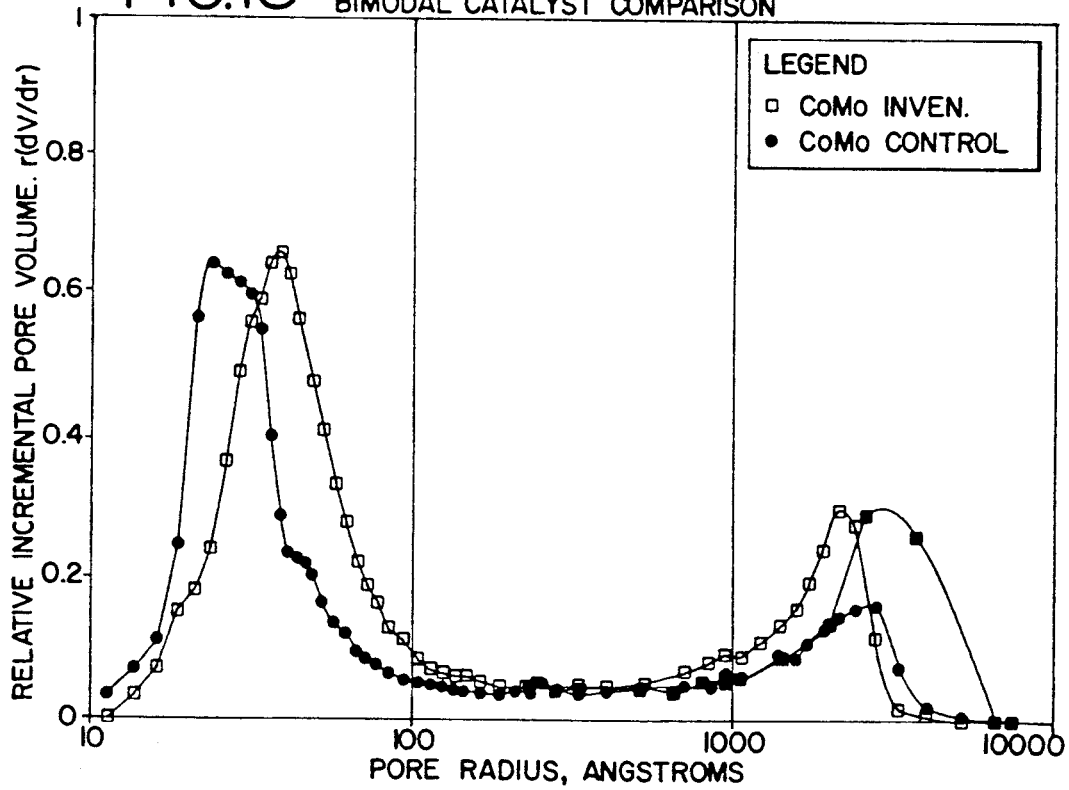
FIG. 18 BIMODAL CATALYST COMPARISON

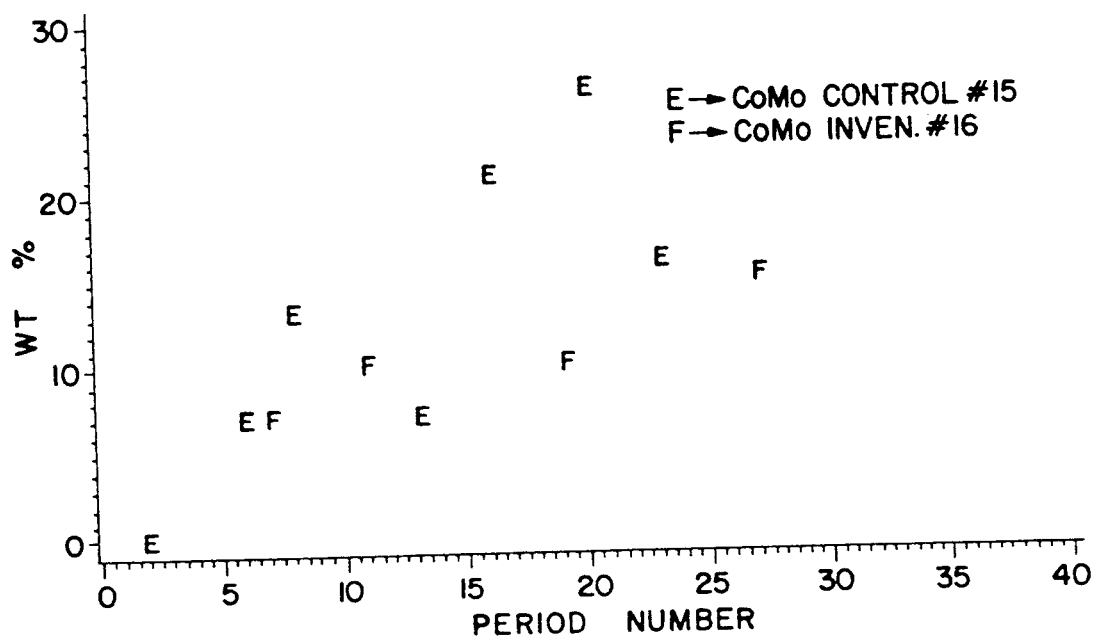

HYDROPROCESSING CATALYST

FIELD OF THE INVENTION

The present invention is a catalyst and process for hydroprocessing a heavy hydrocarbon feedstock. The catalyst of the present invention comprises at least one hydrogenation metal deposited on an inorganic oxide support, said catalyst being characterized by a surface area of greater than about 220 m$^2$/g, a pore volume of about 0.23–0.30 cc/g in pores greater than about 600 Angstroms radius, an average pore radius in pores having less than 600 Angstroms of about 30–70 Angstroms, and an incremental pore volume curve with a maximum at about 25–50 Angstroms radius.

BACKGROUND OF THE INVENTION

This invention relates to a catalytic process for hydroprocessing of heavy processing streams containing asphaltic materials, metals, sulfur-containing compounds, and nitrogen-containing compounds. More particularly, this invention relates to a hydroprocessing catalyst having improved activities in the desulfurization, demetallation, and denitrogenation of heavy hydrocarbon streams.

Decreasing supplies of high quality crude has focused considerable attention on refining lower quality hydrocarbon feedstocks in recent years. It is widely known that various organo-metallic compounds and asphaltenes are present in petroleum crude oils and other heavy petroleum hydrocarbon streams, such as petroleum hydrocarbon residua, both atmospheric and vacuum residua, oils obtained from tar sands and residua derived from tar sand oil, and hydrocarbon streams derived from coal. These hydrocarbon feedstocks contain organo-metallic contaminants which create deleterious effects in various refining processes that employ catalysts in the conversion of heavy hydrocarbon feedstocks.

The most common contaminant metals found in heavy hydrocarbon streams are nickel, vanadium, and iron. The nickel is present in the form of soluble organo-metallic compounds in concentrations of about 20 ppm to 500 ppm. The presence of nickel porphyrin complexes and other organo-nickel complexes causes severe difficulties in the refining and utilization of heavy hydrocarbon fractions, even if the concentration of these complexes is very small. For instance, it is known that a cracking catalyst deteriorates rapidly and its selectivity changes when in the presence of an appreciable amount of organo-nickel compounds. The deposition of nickel compounds in the interstices between catalyst particles can cause deactivation of the catalyst and plugging which leads to a significant pressure drop in fixed bed reactors. Iron-containing and vanadium-containing compounds are present in practically all crude oils that are associated with the high Conradson carbon asphaltenic portion of the crude. Of course, these metals are concentrated in the residual bottoms when a crude is topped to remove fractions that boil below about 450° F. to 600° F. If such residuum is treated by additional processes such as fluid catalytic cracking, the presence of these metals as well as sulfur and nitrogen can adversely affect the catalyst used in these processes. Further, if an oil containing these metals is used as fuel, the metals will cause poor fuel oil performance in industrial furnaces since they corrode the metal from which the furnace was constructed.

While metallic contaminants, such as vanadium, nickel, and iron, are often present in various hydrocarbon streams, other metals are also present in hydrocarbon feedstocks. These metals exist as oxides or sulfides of the particular metal, or as a soluble salt of the metal, or as high molecular weight organo-metallic compounds, including metal naphthenates and metal prophyrins, and derivatives thereof.

Another problem associated with the conversion of heavy hydrocarbon feedstocks is the formation of insoluble carbonaceous substances known as Shell hot filtration solids from the asphaltenic and resin fractions of the feedstock. Although not wishing to be bound by theory, it is believed that these solids are formed when the heavy hydrocarbons are converted more rapidly in the hydroconversion unit to lower molecular weight oils, thereby rendering them a poorer solvent for the unconverted asphaltenic fraction and hence creating these solids.

Shell hot filtration solids can cause operability problems in hydroprocessing units. In high concentrations, these solids accumulate in lines and separators, causing fouling and in some cases interruption or loss of process flow. The formation of these solids results in the agglomeration of the catalyst, thereby causing high pressure drops through fixed catalyst beds. In an ebullated bed type reactor, catalyst agglomeration can prevent proper mixing of the oil, hydrogen, and catalyst. This allows for uncontrolled reactions and local hot spots that can result in failure, fires, or explosions. Further, the higher the conversion level for given feedstocks the greater the amount of Shell Hot Filtration solids formed.

In the past, refiners have limited their use of feedstocks characterized by formation of Shell hot filtration solids, or in the alternative, limited the conversion of such feedstocks.

Treating the above-described heavy hydrocarbon feedstocks to remove unwanted contaminant metals and poisons can be achieved generally by contacting with hydrogen in the presence of a catalyst under conditions that vary somewhat depending on factors such as the particular feed to be upgraded, the type of process being operated, reaction zone capacity, and other factors known to those skilled in the art. The catalyst typically comprises a hydrogenation component deposited on a porous, inorganic, oxide support. Typical catalyst properties included surface areas of about 50–400 m$^2$/g, pore radii of about 10–300 Angstroms, and total pore volumes of about 0.1–20 cc/g.

The key catalyst properties that can be varied to optimize a hydroprocessing catalyst for removal of certain contaminant metals and poisons from certain heavy hydrocarbon feedstocks include catalytic metal loadings, surface area, bulk density, pore volume, and pore radius. The interrelationships between these properties can have various effects on catalyst performance. For example, the desirability of maximizing the surface area in order to provide high exposure of feedstock components to catalytically active sites, and thus maximum activity is well known. At the same time, however, if surface area is too high, bulk density and mechanical strength can decrease to the point that use of the catalyst to remove contaminant metals and poisons from heavy feedstock is impractical or even impossible despite high activity.

Subject to the aforesaid considerations with respect to bulk density and crush strength, it is desirable to provide catalyst particles having a high level of small or intermediate-sized pores because, for a given total pore volume, distribution thereof in smaller pores gives higher surface area than distribution in a smaller number of larger pores. While smaller pores are desirable from the standpoint that they have the highest activities for denitrogenation and desulfurization through maximizing surface area, such pores are also more susceptible to rapid deactivation because pore mouths are quickly blocked by the relatively large species present in heavy hydrocarbon feedstocks. Thus, if too many pores of too small sizes are present, then demetallation activity often declines substantially during process use. If activity declines too rapidly, losses in productivity and increases in catalyst replacement costs can occur.

In the past, bimodal, hydroprocessing catalysts have been developed to strike a balance between catalyst physical properties. Bimodal is defined for the purposes of this application as any catalyst that has at least about 0.05 cc/g of pore volume in pores that are less than about 600 Angstroms radius and at least about 0.05 cc/g of pore volume in pores that are greater than about 600 Angstroms radius. Bimodal catalysts can differ as to surface area, average pore size, and how the the pore volume is distributed throughout the pores.

U.S. Pat. No. 4,454,026 (Hensley, Jr. et al.) discloses a bimodal catalyst characterized by a surface area of 150-190 m$^2$/g and a total pore volume of 0.9-1.5 cc/g. This catalyst includes 0.9-1.2 cc/g in pores less than 600 Angstroms radius and 0.15-0.50 cc/g in pores greater than 600 Angstroms radius. U.S. Pat. No. 4,707,466 (Beaton et al.) discloses a hydroprocessing process for hydrocarbon feedstocks containing asphaltenes, metals, and sulfur compounds. This process uses a bimodal catalyst characterized by a surface area of less than 220 m$^2$/g and a total pore volume of 0.85-1.5 cc/g. Out of that total pore volume, 0.15-0.40 cc/g is in pore having a radius greater than 600 Angstroms radius. While both of these bimodal catalysts have excellent properties, it is desirable to provide higher activity catalyst.

U.S. Pat. No. 4,225,421 (Hensley, Jr. et al.) discloses a process for hydrodemetallation and hydrodesulfurization of hydrocarbon feedstocks containing asphaltenes and metals by contacting the feedstock with hydrogen and a bimodal catalyst consisting essentially of a Group VIB hydrogenation metal on a support comprising alumina wherein said catalyst has a surface area of about 140-300 m$^2$/g and a total pore volume of about 0.4-1.0 cc/g. Out of that total pore volume, 0.06-0.3 cc/g can be in pores having a radius greater than 600 Angstroms. U.S. Pat. No. 4,746,419 (Peck et al.) discloses a bimodal catalyst characterized by a surface area of 75-400 m$^2$/g and a total pore volume of 0.5-1.5 cc/g. Out of that total pore volume, 0.2-0.3 cc/g are in pores greater than 600 Angstroms radius and not more than 0.15 cc/g in pores greater than 2000 Angstroms radius. Although Hensley, Jr. et al. and Peck et al. broadly disclose that high surface area, bimodal catalyst are desirable for hydroprocessing heavy hydrocarbon feedstocks, these patents fail to appreciate that the manner in which the pore volume is distributed throughout the range of pores that are less than 600 Angstroms radius can make a difference in catalyst performance, particularly when the hydrocarbon feedstock contains Shell hot filtration solids. In addition, the Peck et al. patent suggests that pores less than 600 Angstroms radius (mesopores) are irrelevant to the production of Shell hot filtration solids.

Applicants have discovered that a high surface area, bimodal catalyst characterized by the prescribed distribution of incremental pore volume throughout a critical range of pores less than about 600 Angstroms radius unexpectedly performs better than bimodal catalysts that have distributions of incremental pore volume that fall outside the critical pore size range. Applicants will show in the upcoming examples that catalysts that have physical properties such as surface area and pore volumes which fall within the broad teaching of Peck et al. perform differently depending upon whether their incremental pore volume distribution falls outside or inside of the critical range of pore sizes.

It is a general objective of the present invention to balance catalyst physical properties to provide a catalyst that admits a maximum amount of treatable heavy hydrocarbons into the pores of the catalyst while at the same time providing access to a maximum number of active catalytic sites.

It is a general objective of the present invention to provide a catalyst and process affording superior demetallation, dehydrosulfurization, denitrogenation, and hydroconversion of hydrocarbon feedstocks containing metals, sulfur, nitrogen, and Shell hot filtration solids precursors.

It is another general object of the present invention to provide a catalyst and process affording a higher conversion level or higher throughput for heavy hydrocarbon feedstocks that tend to form greater amounts of Shell hot filtration solids, in particular that fraction of the feedstock that boils over 1000° F.

Another object of the present invention is to provide a catalyst and process that produces effluent distillates having lower nitrogen and sulfur contents affording such distillates higher values in subsequent blending processes.

SUMMARY OF THE INVENTION

It has been discovered that the above objects can be obtained through the use of a hydroprocessing catalyst comprising at least one hydrogenation metal on an inorganic oxide support, said catalyst being characterized by a surface area of greater than about 220 m$^2$/g, a pore volume of about 0.23-0.30 cc/g in pores greater than about 600 Angstroms, an average pore radius in pores having less than 600 Angstroms radius of about 30-70, and an incremental pore volume curve with a maximum at about 25-50 Angstroms radius. Incremental pore volume is a novel pore distribution term that is defined as the change in pore volume with respect to the change in pore radius. Applicants have discovered that such a catalyst performs better than other bimodal catalysts that are characterized by similar surface areas and pore volumes greater than about 600 Angstroms radius, but have incremental pore volume curves with maximums either below or above the critical pore range of 25-50 Angstroms radius.

In another embodiment, the present invention is a catalyst system for hydroprocessing a hydrocarbon feedstock comprising a first zone containing a first catalyst comprising: at least one hydrogenation metal deposited on an inorganic oxide support, said first catalyst being characterized by a surface area of less than about 200 m$^2$/g, a pore volume of about 0.23-0.30 cc/g, in pores greater than about 600 Angstroms, an average pore radius in pores having less than 600 Angstroms radius of at least 70, and an incremental pore volume curve with a maximum greater than about 25-50 Angstroms; and a second zone containing a second catalyst comprising at least one hydrogenation metal deposited on an inorganic oxide support, said second catalyst being characterized by a surface area of greater than about 220 m²/g, a pore volume of 0.23-0.30 cc/g in pores greater than about 600 Angstroms, and an incremental pore volume curve with a maximum at about 25-50 Angstroms radius. The catalyst system of the present invention can better handle heavier hydrocarbons feedstocks (e.g. that contain at least about 35 vol % Maya crude) to produce a product that has a lesser amount of Shell hot filtration solids at lower costs in comparison to hydrocarbon products that are produced using the prior art bimodal catalysts.

In another embodiment, the present invention is a process for hydroprocessing a hydrocarbon feedstock comprising contacting said feedstock with hydrogen under conversion conditions with a catalyst comprising at least one hydrogenation metal on an inorganic oxide support, said catalyst being characterized by a surface area of greater than about 220 m²/g, a pore volume of about 0.23-0.30 cc/g greater than about 600 Angstroms, an average pore radius in pores having less than 600 Angstroms radius of about 30-70, and an incremental pore volume curve with a maximum at about 25-50 Angstroms radius. The process of the present invention has hydrodesulfurization, denitrogenation, demetallation, and Ramscarbon removal activities that compare to or exceed those processes that use prior art bimodal catalysts. Furthermore, the process of the present invention produces at lower costs naphtha, distillate, and gas oil and resid fractions having qualities (N₂, sulfur and aromatics) that are comparable to or exceed those of hydrocarbon products produced using prior art bimodal catalysts.

BRIEF DESCRIPTION OF THE DRAWINGS

FIG. 1 is a schematic drawing of the reactor configuration used to test the process of the present invention in Example 1.

FIG. 2 is a pore distribution plot illustrating incremental pore volume (cc/g) on the vertical side and pore radius in Angstroms on the horizontal side for catalysts tested in Examples 1-3.

FIG. 3 is a pore distribution plot illustrating incremental pore volume (cc/g) on the vertical side and pore radius in Angstroms on the horizontal side for catalysts tested in Examples 4, 5, 6, 7, 8, and 9.

FIG. 6 is a plot of percentage Shell hot filtration solids versus time for catalysts tested in Examples 6 and 8.

FIG. 7 is a plot of percentage Shell hot filtration solids versus time for catalysts tested in Examples 7 and 9.

FIG. 10 is a plot of Ramscarbon removal activities versus time for catalysts tested in Examples 10, 11, and 12.

FIG. 11 is a plot of denitrogenation activities versus time for catalysts tested in Examples 10, 11, and 12.

FIG. 12 is a plot of denitrogenation activities versus time for catalysts tested in Examples 13, 14, and 15.

FIG. 13 is a plot of Ramscarbon removal activities versus time for catalysts tested in Examples 13, 14, and 15.

FIG. 14 is a plot of hydrodesulfurization activities versus time for catalysts tested in Examples 13, 14, and 15.

FIG. 15 is a plot of hydrodesulfurization activities versus time for catalysts tested in Examples 5, 16, and 17.

FIG. 16 is a plot of denitrogenation activities versus time for catalysts tested in Examples 5, 16, and 17.

FIGS. 17-18 are pore distribution plots illustrating relative incremental pore volume (cc/g) on the vertical side and pore radius in Angstroms on the horizontal side for catalysts tested in Examples 18-20.

FIG. 33 is a plot of vanadium and nickel removal activities versus time for catalysts tested in Example 20.

BRIEF DESCRIPTION OF THE INVENTION

Figure 4:
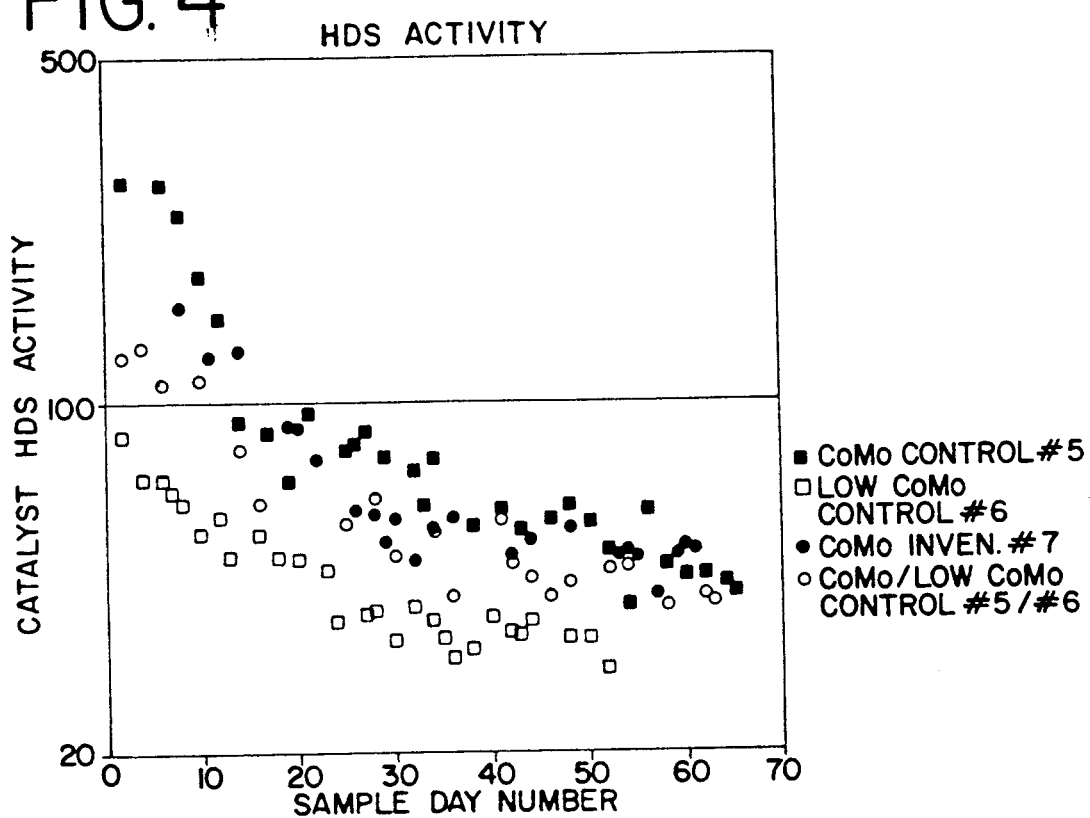
FIG. 4 is a plot of hydrodesulfurization activities versus time for catalysts tested in Examples 4, 5, 6, 7, 8, and 9.

The present invention is directed to a process for the hydroprocessing of heavy hydrocarbon feedstocks which contain asphaltenes, Shell hot filtration solids precursors, contaminant metals, nitrogen compounds, and sulfur compounds using a high surface area, bimodal catalyst that comprises at least one hydrogenation metal deposited on an inorganic oxide support that is characterized by the prescribed distribution of incremental pore volume throughout a critical range of pore radii.

An essential feature of the catalyst of the present invention is a pore distribution such that the incremental pore volume curve has a maximum at about 25-50 Angstroms in radius. Incremental pore volume is defined as r(dV/dr) wherein r is the radius of the pores in Angstroms, V is the pore volume in cc/g, as calculated by the nitrogen desorption BJH method for pores having a radius of less than about 600 Angstroms and as calculated by the mercury porosimetry method for pores having a radius of greater than about 600 Angstroms, and the term (dV/dr) is representative of the change in pore volume with respect to radius. In one embodiment, the catalyst of the present invention has a maximum value for the incremental pore volume curve at about 0.5–1.2 cc/g, preferably about 0.6–0.8 cc/g.

Another feature of the catalyst of the present invention is the distribution of pores is such that the pore volume in pores greater than about 600 Angstroms ranges from about 0.23–0.30 cc/g as measured by mercury porosimetry. The presence of such pore volume allows for larger hydrocarbon molecules to enter the pores of the catalyst, thereby increasing the amount of heavy hydrocarbon feedstock that can be converted to more desirable products.

The catalyst of the present invention comprises a porous, refractory, inorganic, oxide support. Examples of useful supports include alumina, silica, silica-alumina, silica-stabilized alumina, phosphated-alumina, magnesia, boria, titania, zirconia, and the like. A suitable surface area is greater than about 220 m$^2$/g. Assuming a constant pore volume, surface areas greater than about 220 m$^2$/g will maintain an average pore radius small enough to provide for improved hydrogenation activities, and in particular to provide for a reduction in the amount of Shell hot filtration solids. The distribution of pores in the catalyst of the present invention is such that the average pore radius (2V/A), defined as 2×pore volume (cc/g) in pores <600 Angstroms radius (by N$_2$ desorption, BJH method)×10,000 divided by the BET surface area, (m$^2$/g), ranges from about 30–70 Angstroms.

The catalysts of the present invention preferably contain at least one hydrogenation component. Preferred hydrogenation components are selected from the group consisting of Group VIB and VIII metals.

The addition of a Group VIII metal to the catalyst of the catalyst mixture of the invention process is especially useful when ebullated bed reactors are employed. In a fixed bed reactor, the activity of the catalyst dissipates over time, whereas in the ebullated bed reactor, since fresh amounts of catalyst are continuously or intermittently added, the Group VIII metal provides increased overall average activity since the presence of a Group VIII promoter provides a higher initial activity than the catalyst not containing such a promoter. The freshly added higher initial activity catalyst is included in the weighted average used to determine overall average activity. It has been discovered that relatively small amounts of cobalt present in a hydroprocessing catalyst provide excellent hydroconversion activity in an ebullated bed system.

In any event, the hydrogenation metals can be deposited on a porous inorganic oxide support such as alumina, aluminum phosphate, aluminum silicates, and the like, which are suitable for the catalyst of the present invention. The catalyst of the present invention can comprise from about 3.0 to about 22.0 wt % of the Group VIB metal, calculated as the oxide. Preferably, the Group VIB metal is molybdenum present as a MoO$_3$ in the preferred amount ranging from about 0.75 to about 3.25 wt % MoO$_3$ per 30 m$^2$/g of BET surface area present in the catalyst of the invention. The Group VIB and Group VIII classifications of the Periodic Table of Elements can be found on page 628 of Webster's Seventh New Collegiate Dictionary, G & C Merriam Company, Springfield, Mass., U.S.A. (1965). While calculated as the oxide, the hydrogenation metal components of the catalyst can be present as the element, as an oxide thereof, as a sulfide thereof, or mixtures thereof. Molybdenum, which is generally superior than tungsten in demetallation and desulfurization activity as mentioned above, is the preferred Group VIB metal component.

The Group VIII metal can be present in an amount ranging from about 0.4 to about 8.0 wt % calculated as an oxide and based on the total catalyst weight. The preferred Group VIII metals are cobalt and nickel. The cobalt and nickel are preferably present in an amount such that the CoO or Nio to Group VIB metal oxide weight ratio varies from about 0.1 to about 0.3 wt. %.

The hydroprocessing catalyst of the present invention can be prepared by starting with a boehmite alumina gel support having a "needle-like" crystalline morphology and which is precipitated from a solution of sodium aluminate and aluminum sulfate under carefully controlled conditions of pH, temperature, time and agitation. For more details describing the exact conditions required to precipitate out this gel, see Stiles, A.B. *Catalyst Supports and Supported Catalysts:Theoretical and Applied Concepts:Butterworths* (Boston), 1987, 37–46. The "needle-like" morphology of the crystallites imparts high surface area in the catalyst.

Once the individual crystallites are formed, the hydrated boehmite precursor material is then spray-dried at a temperature of greater than about 100° C. at atmospheric pressure. Spray drying causes the crystallites to form "microspheres" which are important because the arrangement of these microspheres can determine the amount of incremental pore volume the catalyst will possess. Also the arrangement of the individual crystallites within the microspheres couple with the temperature of calcination can determine how the incremental pore volume in pores less than 600 Angstroms radius is distributed throughout the pores of the catalyst.

After spray drying, the alumina based catalyst is extruded to provide sufficient pore volume. During extrusion, variables such as the applied shear stress and the concentration of peptizing agents (e.g. nitric oxide) which can be added to the spray drying powder ultimately fix the packing geometry of the microspheres. As the extrusion shear stress decreases, the size and pore volume in the pores greater than 600 Angstroms in the alumina increases. Accordingly, during the preparation procedure for the catalyst of the present invention, the shear stress is monitored and regulated to achieve the desired incremental pore volume in pores greater than 600 Angstroms radius.

The next step in the preparation of the catalyst is calcination. The temperature at which the calcination takes place can play a major role in determining how the incremental pore volume in pores less about 600 Angstroms radius is distributed. Accordingly, during the preparation procedure for the catalyst of the present invention, the calcination temperature is monitored and regulated to achieve the desired distribution of incremental pore volume throughout the pores less than 600 Angstroms in radius. In a preferred embodiment, the calcination temperature ranges from about 900°–1000° F. No steaming of the catalyst is required.

The hydrogenation metal can be incorporated onto the support by impregnation, ion exchange or any other method known to those skilled in the art. In one embodiment, the porous refractory inorganic oxide, e.g., alumina is impregnated with a solution, usually aqueous, containing a heat-decomposable compound of the metal to be placed on the catalyst, drying, and calcining the impregnated material. If the impregnation is to be performed with more than one solution, it is understood that the metals may be applied in any order. The drying is conducted in air at a temperature of about 80° F. (27° C.) to about 350° F. (177° C.) for a period of 1 to 50 hours. Typically, the calcination is carried out at a temperature of about 800° F. (426° C.) to about 1,200° F. (648° C.) for a period of from 0.5 to 16 hours.

While the hydroprocessing catalyst of the present invention can be present in the form of pellets, spheres, or extrudates, other shapes are also contemplated, such as a clover-leaf shape, cross-shape cylinder, or C-shape.

As is well known, heavy hydrocarbon feedstocks used in the process of the present invention contain nickel, vanadium and asphaltenes, e.g., about 40 ppm up to more than 1,000 ppm for the combined total amount of nickel and vanadium and up to about 25 wt % asphaltenes. The process of the present invention is particularly useful in treating feedstocks with a substantial amount of metals containing 150 ppm or more of nickel and vanadium and having a sulfur content in the range of about 1 wt % to about 10 wt %. Typical feedstocks that can be treated satisfactorily by the process of the present invention contain a substantial amount of components that boil appreciably above 1,000° F. Examples of typical feedstocks are crude oils, topped crude oils, petroleum hydrocarbon residua, both atmospheric and vacuum residua, oils obtained from tar sands and residua derived from tar sand oil, and hydrocarbon streams derived from coal. Such hydrocarbon streams contain organo-metallic contaminants which create deleterious effects in various refining processes that employ catalysts in the conversion of the particular hydrocarbon stream being treated. The metallic contaminants found in such feedstocks include, but are not limited to, iron, vanadium, and nickel. In a preferred embodiment, the hydrocarbon feedstock comprises at least about 35 vol % Maya. Maya is crude oil from Mexico that contains high levels of contaminant metals, Ramscarbon, and Shell hot filtration precursors. Because Maya is such a low quality crude it can be acquired at a price cheaper than other crudes. Accordingly, processes that can handle increasing amounts of such crude can be very economical.

The operating conditions for the hydroconversion of heavy hydrocarbon streams, such as petroleum hydrocarbon residua and the like, comprise a hydrogen partial pressure within the range of about 1,000 psia (68 atoms) to about 3,000 psia (204 atoms) and above, an average catalyst bed temperature within the range of about 700° F. (371° C.) to about 850° F. (454° C.) a liquid hourly space velocity (LHSV) within the range of about 0.1 volume of hydrocarbon per hour per volume of catalyst to about 5 volumes of hydrocarbon per hour per volume of catalyst, and a hydrogen recycle rate or hydrogen addition rate within the range of about 2,000 standard cubic feet per barrel (SCFB) (356 m³/m³) to about 15,000 SCFB (2,671 m³/m³). Preferably, the operating conditions comprise a hydrogen partial pressure within the range of about 1,200 psia to about 2,800 psia (81-136 atoms); an average catalyst bed temperature within the range of about 730° F. (387° C.) to about 820° F. (437° C.); and a LHSV within the range of about 0.15 to about 2; and a hydrogen recycle rate or hydrogen addition rate within the range of about 2,500 SCFB (445 m³/m³) to about 5,000 SCFB (890 m³/m³).

If the process of the present invention were to be used to treat hydrocarbon distillates, the operating conditions would comprise a hydrogen partial pressure within the range of about 200 psia (13 atmos) to about 3,000 psia (204 atmos); an average catalyst bed temperature within the range of about 600° F. (315° C.) to about 800° F. (426° C.); a LHSV within the range of about 0.4 volume of hydrocarbon per hour per volume of catalyst to about 6 volumes of hydrocarbon recycle rate or hydrogen addition rate within the range of about 1,000 SCFB (178 m³/m³) to about 10,000 SCFB (1,381 m³/m³). Preferred operating conditions for the hydrotreating of hydrocarbon distillates comprise a hydrogen partial pressure within the range of about 600° F. (315° C.) to about 750° F. (398° C.); a LHSV within the range of about 0.5 volume of hydrocarbon per hour per volume of catalyst to about 4 volumes of hydrocarbon per hour per volume of catalyst; and a hydrogen recycle rate or hydrogen addition rate within the range of about 1,000 SCFB (178 m³/m³) to about 6,000 SCFB (1,068 m³/m³). Generally, the process temperatures and space velocities are selected so that at least 30 vol % of the feed fraction boiling above 1,000° F. is converted to a product boiling below 1,000° F. and more preferably so that at least 60 vol. % of the subject fraction is converted to a product boiling below 1,000° F.

SUMMARY OF EXAMPLES

Examples 1–3 were carried out in parallel fixed-bed upflow reactors contained in a common sand bath with each reactor independently fed with feed and hydrogen. The reactors were of a Unit 1 type configuration as described below. In all three Examples, the first stage contained an equilibrium, demetallation catalyst. In Example 1, the second and third stages contained a high surface area, bimodal, NiMo, control catalyst representative of the type of catalyst disclosed in U.S. Pat. No. 4,225,421. In Example 2, the second and third stages contained a high surface area, bimodal, NiMo control catalyst representative of the catalyst disclosed in U.S. Pat. No. 4,707,466. In Example 3, the catalyst of the present invention was placed in the second and third stages of the reactor. A comparison of Example 3 with Examples 1 and 2 showed that the process that used the catalyst of the present invention in the second and third stages (Example 3) performed better than the process that used the low surface area, bimodal, control catalyst in the second and third stages (Example 2), or the process that used a high surface area, bimodal, control catalyst (Example 1) in the second and third stages. Comparisons of Examples 1–3 also show that distillate products produced using the catalyst of the present invention in the second and third stages had a lower nitrogen and aromatics content in comparison to distillate products produced using the low surface area, control, bimodal catalyst or the high surface area, bimodal control, catalyst in the second and third stages. Lower nitrogen content is important because nitrogen can be a poison to downstream catalytic processes. Lower aromatics content is important because the Clean Air Act of 1990 mandates a reduction in aromatics in gasoline.

Examples 4–9 were run under conditions similar to 1–3 (all used the low surface area, bimodal catalyst described above in the first stage) and used the Unit 1 type configuration. In Examples 6 and 7, the catalyst of the present invention was used in the second and third stages. A comparison of Examples 6 and 7 with Examples 4 and 5 (which used the high surface area, bimodal control catalyst described above in the second and third stages) showed that the processes that used the catalyst of the present invention performed better at lower costs than the processes that used the control catalysts. Similar results were obtained when comparing processes that used the catalyst of the present invention in the second and third stages with processes that used a catalyst particle mixture of the low surface area, bimodal, control catalyst and the high surface area, bimodal control catalyst in the second and third stages. A comparison of Examples 8 and 9 showed the catalyst of the present invention is better at handling heavier feedstocks (35 vol % Maya) and produces a product that has lesser Shell hot filtration solids.

Examples 10-15 represent catalyst tests at first stage conditions of a resid hydrotreating unit. Accordingly, all of the beds contained the same catalyst and the reactors used were of Unit 1, 2, and 3 type. Examples 16-17 were run under conditions similar to Example 4 and employed a reactor of Unit 1 type. Examples 18-20 were run in an ebullated bed reactor.

All units were loaded with diluted beds of catalyst such that the thermal-to-catalytic (T/C) volumetric ratio (defined below) was about 1.1-1.2. Accordingly, the three units used in this study were loaded as follows:

- UNIT 1: Single $\frac{3}{8}''$ ID fixed-bed, upflow reactor.
  40 cc catalyst + 40 cc chips*
  Bed length 16$\frac{1}{4}''$
  Oil flow 12 or 24 cc/hr depending upon desired LHSV
- UNIT 2: Single $\frac{3}{8}''$ ID fixed-bed, upflow reactor.
  42 cc catalyst + 42 cc chips*
  Bed length 16$\frac{3}{4}''$
  Oil flow 25 cc/hr
- UNIT 3 Two $\frac{3}{8}''$ ID fixed-bed, upflow reactors in series.
  No. 1 reactor: 13 cc catalyst + 16 cc chips*
  Bed length 14$\frac{3}{8}''$
  No. 2 reactor: 7 cc catalyst + 7 cc chips*
  Bed length 8$\frac{1}{4}''$
  Overall oil flow 12 cc/hr

*chips denotes non-porous alpha-alumina sized to 14/20 mesh.

The T/C ratio described above was defined as:

$$T/C = \frac{V(\text{thermal}) - V(\text{load}) + V(\text{interstitial}) + V(\text{pore}) - V(\text{gas})}{V(\text{Catalyst})} \quad [1]$$

where:
V(thermal) = Total internal volume of reactor in the thermal zone
V(load) = Settled volume of catalyst charge or load, including diluent
V(interstitial) = Interstitial liquid volume between particles in the catalyst charge = $\epsilon \cdot$ (load)
V(pore) = Liquid volume in equilibrium catalyst pores
V(gas) = Volume in reactor due to gas holdup
V(catalyst) = Settled volume of catalyst in the catalyst charge, excluding diluent V(thermal) was calculated by assuming that the thermal zone (T>750° F.) extended about $\frac{1}{2}''$ above and below the catalyst bed, based on typical measurements. V(load) was calculated from the actual length of the catalyst charge in the reactor tube. V(interstitial) required a knowledge of the term $\epsilon$ which was the interstitial void fraction between particles in the catalyst charge. The term $\epsilon$ was calculated from measurements of the displaced volume of water using incipiently wet catalyst particles. For the catalysts in this study 1/20" cylinders, 1/25" cylinders, or 1/20" trilobes and various mixtures thereof diluted with roughly equal volumes of diluent 14/20 mesh alundum chips $\epsilon$ was determined to be about 0.45. This term was multiplied by V(load) to obtain V(interstitial). V(pore), the pore volume of the catalyst, was expressed as the pore volume accessible to the liquid reactant when the catalyst was at equilibrium. This pore volume was usually best expressed as the pore volume in pores greater than 600 Angstroms since the pore volume in pores less than about 600 Angstroms was generally very small in equilibrium, coked catalysts. V(catalyst) was the volume of catalyst prior to diluent addition.

Sample Calculation of T/C Ratio (Example 4)

Void volume=4.83 cc/in. (assuming $\frac{5}{8}''$ ID with $\frac{1}{8}''$ OD internal thermowell)
Catalyst bed length=16$\frac{1}{4}''$ (40 cc catalyst+40 cc chips)
Thermal zone length=16$\frac{1}{4}''$+$\frac{1}{2}''$+$\frac{1}{2}''$=17$\frac{1}{4}''$
Weight of 40 cc catalyst charge=20.8 g
pore volume in pores greater than about 600 Angstroms=0.20 cc/g
Interstitial void fraction=$\epsilon$=0.45
V(thermal)=17$\frac{1}{4}$×4.83=84 cc
V(load)=16$\frac{1}{4}$×4.83=78.5 cc
V(interstitial)=0.45×78.5=35.3 cc
V(pore)=20.8×0.20=4.2 cc
v(catalyst)=40 cc Substituting into Equation 1 above:

$$\frac{T}{C} = \frac{84 - 78.5 + 35.3 + 4.2}{40} = 1.13$$

Formulas Used in Determining Hydrogenation Activities

DESULFURIZATION

Pseudo second-order with an activation energy of 83,300 Btu/lb-mol.

$$A_s = \frac{\left(\frac{1}{0.93\,S_P} - \frac{1}{S_F}\right)(LHSV)}{K \cdot P \cdot e^{-E/RT}}$$

where:
$A_S$=Desulfurization activity
$S_P$=Product sulfur concentration, wt %
$S_F$=Feed sulfur concentration, wt %
LHSV=Liquid hourly space velocity (volumetric), hr$^{-1}$
$K_S$=Feed factor for desulfurization
P=Total pressure, psig
E=Activation energy for desulfurization, 83,300 Btu/lb
T=Absolute kinetic average temperature based on desulfurization, °R Note:

$$T = \frac{-E}{R\ln[(1/3)\,e^{-E/RT_1} + (1/3)\,e^{-E/RT_2} + (1/3)\,e^{-E/RT_3}]}$$

where:
E = Activation energy for desulfurization
$T_1$ = Absolute temperature in Bed 1, °R
$T_2$ = Absolute temperature in Bed 2, °R
$T_3$ = Absolute temperature in Bed 3, °R

RAMSCARBON REMOVAL

Pseudo second-order with an activation energy of 83,300 Btu/lb.

$$A_S = \frac{\left(\frac{1}{0.93\,R_P} - \frac{1}{R_F}\right)(LHSV)}{K_R \cdot P \cdot e^{-E/RT}}$$

where:
$A_R$ = Ramscarbon removal activity
$R_P$ = Product Ramscarbon concentration, wt %
$R_F$ = Feed Ramscarbon concentration, wt %
$k_R$ = Feed factor for Ramscarbon removal
E = Activation energy for Ramscarbon removal, 83,300 Btu/lb-mol
T = Absolute kinetic average temperature based on desulfurization, °R

DEVANADATION

First order with an activation energy of 83,300 Btu/lb-mol.

$$A_V = \frac{\left(Ln\frac{V_F}{0.93\,V_P}\right)(LHSV)}{K_V \cdot P \cdot e^{-E/RT}}$$

where:
$A_V$ = Devanadation activity
$V_F$ = Feed vanadium concentration
$V_P$ = Product vanadium concentration
$K_V$ = Feed factor for devanadation
E = Activation energy for devanadation, 83,300 Btu/lb
T = Absolute kinetic average temperature based on desulfurization, °R

DENITROGENATION

First order with an activation energy of 45,400 Btu/lb-mol.

$$A_N = \frac{\left(LN\frac{N_F}{0.93\,N_P}\right)(LHSV)}{K_N \cdot P \cdot e^{-E/RT}}$$

where:
$A_N$ = Denitrogenation activity
$N_F$ = Feed nitrogen concentration
$N_P$ = Product nitrogen concentration
$K_N$ = Feed factor for denitrogenation
E = Activation energy for denitrogenation, 45,400 Btu/lb-mol.
T = Absolute kinetic average temperature based on desulfurization, °R

Sample Calculation of Points Along the Pore Distribution Plot of FIG. 2

FIG. 2 is a pore distribution plot for Catalysts 2, 3, and 4. Plotted along the horizontal is the pore radius in Angstroms. Plotted along the vertical is the incremental pore volume which has been defined herein as r(dV/dr). In order to illustrate how these values were calculated, two sample points along the Catalyst 2 curve were taken. Sample Point A, which was representative of that part of the pore distribution plot having pore volume in pores less than 600 Angstroms radius and was measured using the BJH method of nitrogen desorption, had a incremental pore volume value of about 0.45 cc/g and a radius of about 21.25 Angstroms. Sample Point B, which was representative of that region of the pore distribution plot having pore volume in pores greater than about 600 Angstroms radius and was measured using mercury porosimetry, had an incremental pore volume of about 0.11 cc/g and a radius of about 2811 Angstroms.

With regard to Sample Point A, Table 1 is an excerpt of the raw nitrogen desorption data for Catalyst 2 (NiMo Control).

TABLE 1

| Catalyst 2 - Raw Nitrogen Desorption Data | | |
|---|---|---|
| Pore Radius Range | Pore Volume | |
| (Angstroms) | Incremental (cc/g) | Cumulative (cc/g) |
| +100.0–90.0 | 0.005937 | 0.084452 |
| +90.0–80.0 | 0.006980 | 0.091447 |
| +80.0–75.0 | 0.004168 | 0.095607 |
| +75.0–70.0 | 0.004689 | 0.100304 |
| +70.0–65.0 | 0.005319 | 0.105612 |
| +65.0–60.0 | 0.006955 | 0.112573 |
| +60.0–55.0 | 0.008505 | 0.121119 |
| +55.0–50.0 | 0.011226 | 0.132295 |
| +50.0–47.5 | 0.008076 | 0.140414 |
| +47.5–45.0 | 0.009486 | 0.149853 |
| +45.0–42.5 | 0.010566 | 0.160488 |
| +42.5–40.0 | 0.012772 | 0.173281 |
| +40.0–37.5 | 0.017523 | 0.190709 |
| +37.5–35.0 | 0.025718 | 0.216427 |
| +35.0–32.5 | 0.035298 | 0.251776 |
| +32.5–30.0 | 0.041784 | 0.293490 |
| +30.0–27.5 | 0.047042 | 0.340549 |
| +27.5–25.0 | 0.054353 | 0.394947 |
| +25.0–22.5 | 0.060436 | 0.455398 |
| +22.5–20.0 | 0.052963 | 0.508379 |
| +20.0–17.5 | 0.329573 | 0.541268 |
| +17.5–15.0 | 0.023378 | 0.564622 |
| +15.0–12.5 | 0.014885 | 0.579592 |
| +12.5–10.0 | 0.010154 | 0.589632 |

The first column lists the pore radius range in Angstroms. The second column lists the incremental pore volume in cc/g. The third column lists the cumulative pore volume in cc/g. The box-in area highlights the raw data points from which the Sample Point A coordinates were calculated. The r value was calculated by taking the average of the radius range reported in the first column of Table 3, i.e., r = (22.2 + 20.0)/2 which equals 21.25. The (dV/dr) value was calculated by dividing the change in cumulative pore volume by the corresponding change in pore radius, i.e., (0.508–0.455)/(22.5–20.0) which equals 0.021. Accordingly, the incremental pore volume is the product of r and (dV/dr) which is 21.25 * 0.021 or 0.45 cc/g.

With regard to Sample Point B, Table 2 is an excerpt of the raw mercury porosimetry data for Catalyst 2.

TABLE 2

| Catalyst 2 Raw Mercury Porosimetry Data | |
|---|---|
| Pore Radius (microns) | Intrusion Pore Vol. (cc/g) |
| +82.2107 | +0.0000 |
| +30.1491 | +0.0194 |
| +9.0993 | +0.0281 |

TABLE 2-continued

Catalyst 2 Raw Mercury Porosimetry Data

| Pore Radius (microns) | Intrusion Pore Vol. (cc/g) |
|---|---|
| +4.5405 | +0.0293 |
| +3.6251 | +0.0293 |
| +2.5896 | -0.0293 |
| +2.2662 | -0.0293 |
| +0.9086 | +0.0299 |
| +0.6052 | +0.0313 |
| +0.4542 | +0.0327 |
| +0.3622 | +0.0382 |
| +0.3028 | +0.0521 |
| +0.2594 | +0.0694 |
| +0.2271 | +0.0871 |
| +0.2018 | +0.1029 |
| +0.1816 | +0.1137 |
| +0.1632 | +0.1247 |
| +0.1497 | +0.1316 |
| +0.1294 | +0.1424 |
| +0.1135 | +0.1507 |
| +0.1006 | +0.1585 |

The first column lists the pore radius in microns. The second column lists the cumulative pore volume in cc/g. The boxed-in area highlights the raw data points from which Sample Point B coordinates were determined. The r value was calculated by taking the average of two successive pore radius terms and multiplying by 10,000 to convert microns to Angstroms, i.e., ((0.3028+0.2594)/2)*10,000 which equals 2811 Angstroms. The (dV/dr) value was calculated by dividing the change in cumulative pore volume by the corresponding change in pore radius, i.e., (0.069-0.052)/(30-28-2594), which equals 0.00004. Accordingly, the incremental pore volume is the product of r and (dV/dr) which is 2811*0.00004 or 112 cc/g.

EXAMPLE 1

Example 1 was carried out in several parallel Unit 1 type reactors contained in a common sand bath, with each reactor independently fed with feed and hydrogen. In Example 1, 13 cc of Catalyst 1 which had the physical properties shown in Table 3 and 13 cc of non-porous alpha-alumina chips sized to 14/20 mesh were loaded into bed 1 of a ⅜ inch ID reactor, as shown in the schematic of FIG. 1. Catalyst 1 was an equilibrium, demetallation catalyst.

TABLE 3

Properties of Catalyst 1
Composition, Wt % Fresh Catalyst Basis, Al-Tie Point Method

| Ni | 3.26 |
|---|---|
| V | 7.52 |
| Fe | 1.09 |
| Co | 1.79 |
| Mo | 6.75 |
| Na | 3.26 |
| Si | 1.52 |
| Al (Fresh Basis) | 50.3 |
| Al (Spent Basis) | 22.2 |
| C | 69.6 |
| H | 2.99 |
| N | <0.1 |
| S | 15.3 |

Beds 2 and 3 contained 27 cc of Catalyst 2 (NiMo Control) which had the physical properties shown in Table 4 and 27 cc of non-porous alpha-alumina diluent sized to 14/20 mesh.

TABLE 4

NiMo Catalyst Properties

| Example No. | 1 | 2 | 3 |
|---|---|---|---|
| Catalyst in Beds 2 & 3 | 2 | 3 | 4 |
| Nominal Composition, Wt % | | | |
| NiO | 3.5 | 3.5 | 3.5 |
| MoO₃ | 13.0 | 13.0 | 13.0 |
| SiO₂ | <0.1 | <0.1 | <0.1 |
| Porosity | | | |
| • N₂ Desorption | | | |
| BET Surface Area, m²/g | 299 | 161 | 287 |
| Pore Volume <600Å (BJH), cc/g | 0.590 | 0.636 | 0.622 |
| Average pore Radius (2V/A,Å) | 39.5 | 79 | 43 |
| • Hg Porosimetry Pore Volume >600Å, cc/g | 0.186 | 0.280 | 0.254 |

The catalyst to diluent ratio was about 1:1 in order to achieve a thermal-to-catalytic (T/C) ratio of about one. Once loaded, the catalyst was contacted with Feed A which had the physical properties shown below in Table 5 at the following conditions:
Upflow, Fixed-bed
785° F., 2000 psig, 0.3 LHSV, 7000 SCFB

TABLE 5

Fixed-Bed Feed Properties

| ID | FEED A | FEED B |
|---|---|---|
| Total Feed: | | |
| °API | 7.7 | 8.5 |
| SG 60/60 | 1.017 | 1.0107 |
| Ni, ppm | 40 | 57 |
| V, ppm | 170 | 242 |
| Fe, ppm | 4 | 9 |
| S, Wt % | 2.68 | 3.08 |
| N, Wt % | 0.449 | 0.441 |
| O, Wt % | 0.44 | 0.51 |
| C, Wt % | 86.01 | 85.57 |
| H, Wt % | 10.25 | 10.14 |
| Ramscarbon, Wt % | 13.3 | 14.6 |
| Breakdown, Wt % Feed: | | |
| 360-650° F. | 7.3 | 5.5 |
| 650-100° F. | 27.5 | 27.9 |
| 1000° F.+ | 65.2 | 66.6 |
| 1000° F.+ Wt %: | | |
| Oils | 22.0 | 19.4 |
| Resins | 66.4 | 65.5 |
| Asphaltenes | 11.6 | 15.1 |
| Approximate Maya Content, vol % | 20 | 35 |

EXAMPLE 2

Example 2 was similar to Example 1 except Beds 2 and 3 contained Catalyst 3 (NiMo Control) which had the physical properties shown in Table 4.

EXAMPLE 3

Example 3 was similar to Example 1 except Beds 2 and 3 contained Catalyst 4 (NiMo Invention) which had the physical properties shown in Table 4

DISCUSSION OF EXAMPLES 1-3

Catalyst 2 was a high surface area, bimodal, control catalyst representative of the type of catalyst disclosed in U.S. Pat. No. 4,225,421. Although, as shown is Table 2, Catalyst 2 (NiMo control) had a surface area, pore volume in pores less than about 600 Angstroms radius, and average pore radius in pores less than 600 Angstroms similar to Catalyst 4 (NiMo invention), its pore volume in pores greater than about 600 Angstroms was significantly less than that of Catalyst 4 (NiMo invention), and its change in pore volume with respect to change in pore radius (incremental pore volume) curve had a maximum in a pore radius range outside (lower) that of Catalyst 4 (NiMo invention). See FIG. 2. Catalyst 3 was a low surface area, bimodal, control catalyst that was representative of the type of catalyst disclosed in U.S. Pat. No. 4,707,466. Although, as shown is Table 2, Catalyst 3 (NiMo control) had a pore volume in pores less than 600 Angstroms radius similar to Catalyst 4 (NiMo invention), its surface area was significantly less than that of Catalyst 4 (NiMo invention), its average pore radius in pores less than 600 Angstroms is significantly greater than that of Catalyst 4 (NiMo invention), and its change in pore volume with respect to change in pore radius (incremental pore volume) curve had a maximum in a pore radius range outside (higher) that of Catalyst 4 (NiMo invention). See FIG. 2.

Table 6 below shows that the Catalyst 4 (NiMo invention) had the highest HDN, HDS, HDC, and HDM conversion after day 4 and 10. After day 32, invention Catalyst 4 (NiMo invention) had HDN, HDS and HDC conversions comparable to Catalyst 2 (NiMo control) and the best HDM conversion. Catalyst 3 (NiMo control) had the worst performance of the three NiMo catalysts.

is the product stream is less toxic to further downstream catalytic processes.

TABLE 7

Yields and Qualities of Distilled Liquid Product After 30 Days on Resid (Examples 1-3)

| Example No. | 1 | 2 | 3 |
|---|---|---|---|
| NAPHTHA, vol % | 7.2 | 7.1 | 5.2 |
| Gravity, °API | 53.8 | 54.3 | 57.8 |
| Nitrogen, wt % | .0170 | .0220 | .0150 |
| DISTILLATE, vol % | 27.8 | 27.1 | 29.4 |
| Gravity, °API | 26.7 | 26.9 | 27.7 |
| Nitrogen, wt % | .0880 | .1020 | .0870 |
| Total Aromatics (MS-HCTA), vol % | 57.3 | 54.9 | 53.4 |
| GAS OIL, vol % | 40.0 | 38.9 | 41.7 |
| Gravity, °API | 16.6 | 16.1 | 16.5 |
| Nitrogen, wt % | .224 | .233 | .238 |
| Total Aromatics (MS-HCTA), vol % | 52.5 | 53.5 | 52.0 |
| Tetra + Aromatics (MS-HCTA), vol % | 7.5 | 7.8 | 7.4 |
| RESID, vol % | 28.2 | 29.0 | 26.8 |
| Gravity, °API | 7.5 | 7.6 | 7.1 |
| Nitrogen, wt % | .685 | .625 | .609 |

SUMMARY OF EXAMPLES 4-9

TABLE 6

Conversions (wt %) In Examples 1-3

| EXAMPLE NO. | BED 1 CATALYST # | BED 2 & 3 CATALYST # | T/C RATIO (BEDS 1-3) | DAY 4 | | | | DAY 10 | | | | DAY 32 | | | |
|---|---|---|---|---|---|---|---|---|---|---|---|---|---|---|---|
| | | | | HDN | HDS | HDC | HDM | HDN | HDS | HDC | HDM | HDN(1) | HDS | HDC | HDM |
| 1 | 1 | 2 | 1.1 | 50.6 | 94.9 | 74.7 | 95.2 | 34.1 | 90.1 | 65.2 | 95.7 | 22.0 | 83.0 | 57.8 | 92.9 |
| 2 | 1 | 3 | 1.1 | 42.8 | 94.4 | 72.8 | 95.7 | 28.3 | 88.8 | 64.6 | 95.2 | 17.6 | 80.2 | 56.9 | 92.9 |
| 3 | 1 | 4 | 1.1 | 54.3 | 96.5 | 77.4 | 95.7 | 35.4 | 90.3 | 66.2 | 95.7 | 22.0 | 82.3 | 57.9 | 93.8 |

NOTES
(1) Due to moderate scatter, an average value was calculated over days 25-32
(2) HDC = Ramscarbon conversion, wt %
(3) HDM = Ni + V Conversion, wt %
(4) HDS, HDN = Desulfurization, denitrogenation wt %

Table 7 shows that Catalyst 4 (NiMo invention) produced naphtha having the lowest nitrogen and total aromatics contents. Moreover, Catalyst 4 (NiMo invention) produced gas oil with nitrogen contents that were comparable with Catalyst 2 (NiMo control) and Catalyst 3 (NiMo control), but with lower total aromatics content and tetra+aromatic contents. Catalyst 4 (NiMo invention) produced resid having the lowest nitrogen content. The benefit of producing hydrocarbon products with lower aromatics content is that it's easier to comply with the lower aromatic contents requirements of the 1990 Clean Air Act. The benefit of producing a hydrocarbon product with lower nitrogen content that Examples 4-9 were run using a reactor configuration similar to that shown in FIG. 1 and described in Examples 1-3, except they were run using separate independently, electrically heated reactors of the Unit 1 type.

The catalysts that were used in Beds 2 and 3 had the physical properties shown below in Table 8.

TABLE 8

FRESH CATALYST PROPERTIES

| Catalyst No. | Catalyst | Metals, Wt % | | | BET Surface Area (m²/g) | BJH N₂ Pore Vol (<600Å cc/g) | Avg Mesopore Diameter (2V/A,Å) | Hg Pore volume (>600Å, cc/g) | Bulk Density, lb/ft³ | Dry Attrition Wt % |
|---|---|---|---|---|---|---|---|---|---|---|
| | | NiO | CoO | MoO₃ | | | | | | |
| 5 | CoMo Control | — | 3.6 | 13.6 | 300 | 0.64 | 42.5 | 0.20 | 34.3 | 1.31 |
| 6 | Low CoMo Control | — | 0.6 | 3.9 | 194 | 0.801 | 82.5 | 0.25 | 20.6 | 2.06 |
| 7 | CoMo Invention | — | 3.9 | 14.1 | 282 | 0.70 | 50 | 0.26 | 30.6 | 1.53 |
| 8 | High CoMo Control | — | 3.5 | 14.0 | 164 | 0.71 | 86 | 0.24 | 30.9 | — |
| 9 | NiMo Control | 3.3 | — | 11.6 | 325 | 0.54 | 33 | 0.20 | 36.1 | 0.7(2) |
| 10 | NiMo Invention | 2.7 | — | 13.9 | 286 | 0.71 | 50 | 0.26 | 30.6 | — |
| 11 | NiMo Invention | 2.2 | — | 16.2 | 251 | 0.65 | 51.5 | 0.25 | 32.4 | — |

Once the reactor was loaded, the catalyst was contacted with a variety of feeds at the following conditions:

Upflow, Fixed-bed
790° F., 2000 psig, 0.2 LHSV, 10000 SCFB

The feeds that were used included Feeds A and B which had the physical properties shown above in Table 5, and Feeds C and D which had the physical description shown below in the footnotes of Table 9.

A summary of Examples 4-9 is shown below in Table 9.

TABLE 9

Run Summary for Examples 4-9

| Example No. | Catalysts in Beds 2 & 3 | Days on Resid | Feed | Approximate Maya Content of Feed. Vol % |
|---|---|---|---|---|
| 4 | 5 (Control) | 1-65 | A | 20 |
| 5 | 6 (Control) | 1-14 | C[1] | 20 |
|   |   | 15-28 | A | 20 |
|   |   | 29-36 | D[2] | 20 |
|   |   | 37-53 | A | 20 |
| 6 | 7 (Invention) | 1-40, 60-62 | A | 20 |
| 7 | 7 (Invention) | 41-59 | B | 35 |
| 8 | 5 & 6 (Control) | 1-34, 50-65 | A | 20 |
| 9 | 5 & 6 (Control) | 35-50 | B | 35 |

[1]Feed C is a blend of Feed D and decanted oil that is similar to Feed A.
[2]Feed D is a commercial vacuum resid feed with 1000° F. + properties similar to feed A's 1000° F. + properties.

EXAMPLE 4

Example 4 was similar to Example 1, except Beds 2 and 3 contained Catalyst 5 (CoMo control) which had the physical properties shown above in Table 8.

EXAMPLE 5

Example 5 was similar to Example 4, except Beds 2 and 3 contained Catalyst 6 (low CoMo control) which had the physical properties shown above in Table 8.

EXAMPLE 6

Example 6 was similar to Example 5, except Beds 2 and 3 contained Catalyst 7 (CoMo invention) which had the physical properties shown above in Table 8.

EXAMPLE 7

Example 7 was similar to Example 6, except Feed B instead of Feed A was used.

EXAMPLE 8

Example 8 was similar to Example 6, except Beds 2 and 3 contained a 50/50 volume mixture of Catalyst 5 (CoMo control) and Catalyst 6 (low CoMo control).

EXAMPLE 9

Example 9 was similar to Example 8, except Feed B was used instead of Feed A.

DISCUSSION OF EXAMPLES 4-9

Catalyst 5 (CoMo control) was representative of the type of catalyst disclosed by U.S. Pat. No. 4,225,421. Although, as shown is Table 8, Catalyst 5 (CoMo control) had a surface area and average pore radius in pores greater than 600 Angstroms similar to Catalyst 7 (CoMo invention), its pore volume in pores greater than about 600 Angstroms was less than that of Catalyst 7 (CoMo invention), and its change in pore volume with respect to change in pore radius (incremental pore volume) curve had a maximum that occurred in a pore radius range outside (lower) that of Catalyst 7 (CoMo invention). See FIG. 3. Catalyst 6 (low CoMo control) was representative of the type of catalyst disclosed by U.S. Pat. No. 4,707,466. Although, as shown in Table 8, Catalyst 6 (low CoMo control) had a pore volume in pores less than about 600 Angstroms radius similar to Catalyst 7 (CoMo invention), its surface area was significantly less than that of Catalyst 7 (CoMo invention), its average pore radius in pores less than 600 Angstroms was significantly greater, and its change in pore volume with respect to change in pore radius (incremental pore volume) curve had a maximum that occurred in a pore radius range outside (higher) that of Catalyst 7 (CoMo invention). See FIG. 3.

Figure 5:
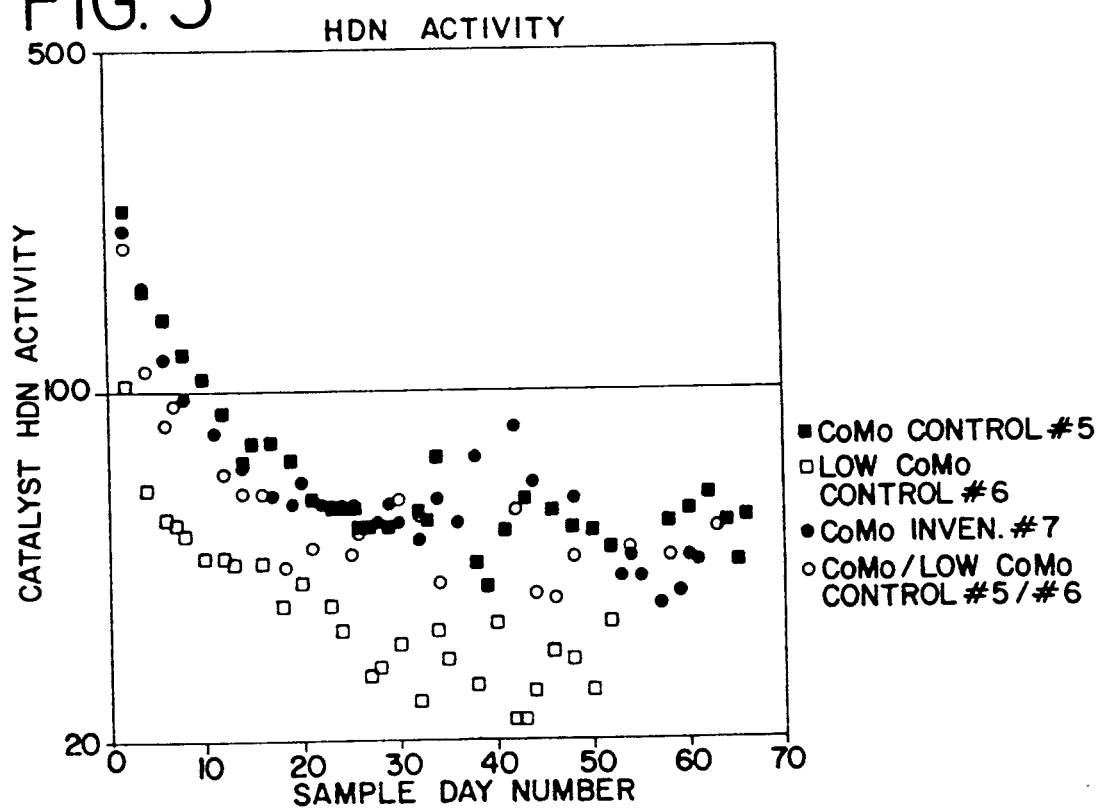
FIG. 5 is a plot of denitrogenation activities versus time for catalysts tested in Examples 4, 5, 6, 7, 8, and 9.

FIGS. 4 and 5 show that Catalyst 7 (CoMo invention) in Example 6 had Volumetric HDS and HDN activities, respectively, similar to the Catalyst 5 (CoMo control) in Example 4. However, Table 8 above shows that Catalyst 7 (CoMo invention) in Example 6 had about 10% lower bulk density compared with Catalyst 5 (CoMo control) in Example 4. Thus, the reported activities in FIGS. 4 and 5 could be achieved with a lower catalyst weight and potentially lower catalyst cost using Catalyst 7 (CoMo invention). Catalyst 7 (CoMo invention) in Example 6 had better HDS and HDN activities compared with the Catalyst 6 (low CoMo control) in Example 5 and the 50/50 Catalyst 5 (CoMo control)/Catalyst 6 (low CoMo control) mixture in Example 7, as seen in FIGS. 4 and 5, respectively.

Table 10 below shows that distilled product naphtha, distillate, gas oil and resid fractions from the Catalyst 7 (CoMo invention) in Example 6 had qualitites (e.g., N, S and aromatics) that were comparable to or exceeded the Catalyst 5 (CoMo control) in Example 4.

TABLE 10

Distilled Product Quality After 25-30 Days on Resid (Examples 4-6, 8) Feed A

| Example No. | 4 Day 25-29 | 5 Day 23, 24, 27, 28 | 6 Day 29-34 | 8 Day 26-30 |
|---|---|---|---|---|
| Naphtha, vol % | 12.5 | 9.8 | 9.9 | 10.4 |
| Gravity, °API | 57.2 | 55.0 | 54.6 | 56.8 |
| Nitrogen, ppm | 100 | 310 | 139 | 207 |
| Sulfur, wt % | .021 | .024 | .050 | .029 |
| Distillate, vol % | 38.8 | 36.5 | 41.3 | 39.6 |
| Gravity, °API | 31.6 | 31.9 | 30.3 | 29.9 |
| Nitrogen, ppm | 920 | 1450. | 912. | 1150. |
| Sulfur, wt % | .019 | .044 | .025 | .031 |
| Gas Oil, vol % | 45.3 | 48.9 | 41.2 | 43.8 |
| Gravity, °API | 16.5 | 15.5 | 16.7 | 16.0 |
| Nitrogen, wt % | .286 | .353 | .287 | .336 |
| Sulfur, wt % | .204 | .385 | .254 | .34 |
| % C$_4$, NMR Mass Spec. Vol % | 30.8 | 33.3 | 29.7 | 29.9 |
| Total Aromatics | 48.3 | 49.0 | 43.6 | 41.2 |
| Mono - | 16.7 | 14.9 | 13.8 | 12.7 |
| Di+ | 31.6 | 34.1 | 29.8 | 28.5 |
| Resid, vol % | 9.0 | 8.8 | 13.5 | 5 |
| Gravity, °API | 0.1 | −3.0 | 4.0 | 3.1 |
| Nitrogen, wt % | .752 | .884 | .779 | 1.02 |
| Sulfur, wt % | .64 | .80 | .61 | .71 |
| % C$_4$, NMR | 49.7 | 52.1 | 43.9 | 45.8 |
| RAMSCARBON wt % | 33.3 | 33.7 | 26.5 | 28.9 |
| H/C (molar) | 1.25 | 1.18 | 1.34 | 1.28 |
| Ni, ppm | 24 | 30 | 15 | 25 |
| V, ppm | 3 | <2 | <2 | <2 |
| Fe, ppm | <2 | <2 | <2 | <2 |

Moreover, these product qualities exceeded the product qualities of the Catalyst 6 (low CoMo control) in Example 5 and the 50/50 Catalyst 5 (CoMo control)/Catalyst 6 (low CoMo control) mixture Example 8.

FIG. 6 shows that Shell solids were similar in Example 6 which used Catalyst 7 (CoMo invention) and Example 8 which used the mixture of Catalyst 5 (CoMo control)/ Catalyst 6 (low CoMo control) when processing Feed A (20 vol % Maya). However, FIG. 7 shows that Shell solids are significantly reduced in Example 7 which used Catalyst 7 (CoMo invention) when processing Feed B (35 vol % Maya) compared with Example 9 which used the 50/50 Catalyst 5 (CoMo control)/Catalyst 6 (low CoMo control) mixture. Unit operability was also significantly improved in Example 7 with no upsets of any kind while processing Feed B. However, unit operability was significantly worse in Example 9.

Table 11 shows that the product quality of the distilled naphtha, distillate, gas oil and resid fractions for Catalyst 7 (CoMo invention) in Example 7 was comparable to or exceeded that for the Catalyst 5 (CoMo control)/Catalyst 6 (low CoMo control) mixture in Example 9.

TABLE 11

Distilled Product Quality After
50 Days on Resid (Examples 7, 9) Feed B

| Example No. | 7<br>Day 53-59[1] | 9<br>Day 42-48[2] |
|---|---|---|
| Naphtha, vol % | 7.5 | 9.7 |
| Gravity, °API | 52.3 | 55.9 |
| Nitrogen, ppm | 168 | 327 |
| Sulfur, wt % | .024 | .051 |
| Distillate, vol % | 37.5 | 37.8 |
| Gravity, °API | 30.3 | 30.5 |
| Nitrogen, ppm | 1233 | 1240 |
| Sulfur, wt % | .044 | .045 |
| Gas Oil, vol % | 45.3 | 41.4 |
| Gravity, °API | 16.3 | 16.1 |
| Nitrogen, ppm | .315 | .348 |
| Sulfur, wt % | .385 | .41 |
| % $C_A$, NMR | 29.8 | 30.3 |
| Mass Spec, vol % | | |
| Total Aromatics | 45.1 | 45.1 |
| Mono - | 15.4 | 15.1 |
| Di + | 29.7 | 30.0 |
| Resid, vol % | 12.9 | 14.5 |
| Gravity, °API | 1.2 | 1.8 |
| Nitrogen, ppm | .842 | .818 |
| Sulfur, wt % | .94 | .86 |
| % $C_A$, NMR | 46.6 | 45.1 |
| RAMSCARBON, wt % | 30.5 | 28.4 |
| H/C (molar) | 1.31 | 1.29 |
| Ni, ppm | 30 | 26 |
| V, ppm | 4 | 3 |
| Fe, ppm | 3 | 5 |

[1] Feed B was processed from Day 41-59 for Example 7.
[2] Feed B was processed from Day 35-50 for Example 9.
The feed in both cases was Feed B.

SUMMARY OF EXAMPLE 10-12

Examples 10-12 represent catalyst tests at first stage RHU conditions. Accordingly, Beds 1, 2 and 3 in the reactor diagram of FIG. 1 all contained the same catalyst. In these Examples each catalyst was loaded into a ⅞ inch ID Unit 1 type reactor. The catalyst-to-diluent ratio was selected to match the thermal-to-catalytic ratio of the commerical resid hydrotreating unit of about one. The loaded catalyst was then contacted with Feed A at the following conditions:

Fixed-bed, upflow
790° F., 2000 psig, 0.6 LHSV, 10,000 SCFB

EXAMPLE 10

In Example 10, Catalyst 8 (high CoMo control) which had the physical properties shown in Table 8 was tested.

EXAMPLE 11

Similar to Example 10, except Catalyst 5 (CoMo control) was used.

EXAMPLE 12

Similar to Example 10, except Catalyst 7 (CoMo invention) was used.

DISCUSSION OF EXAMPLES 10-12

Figure 8:
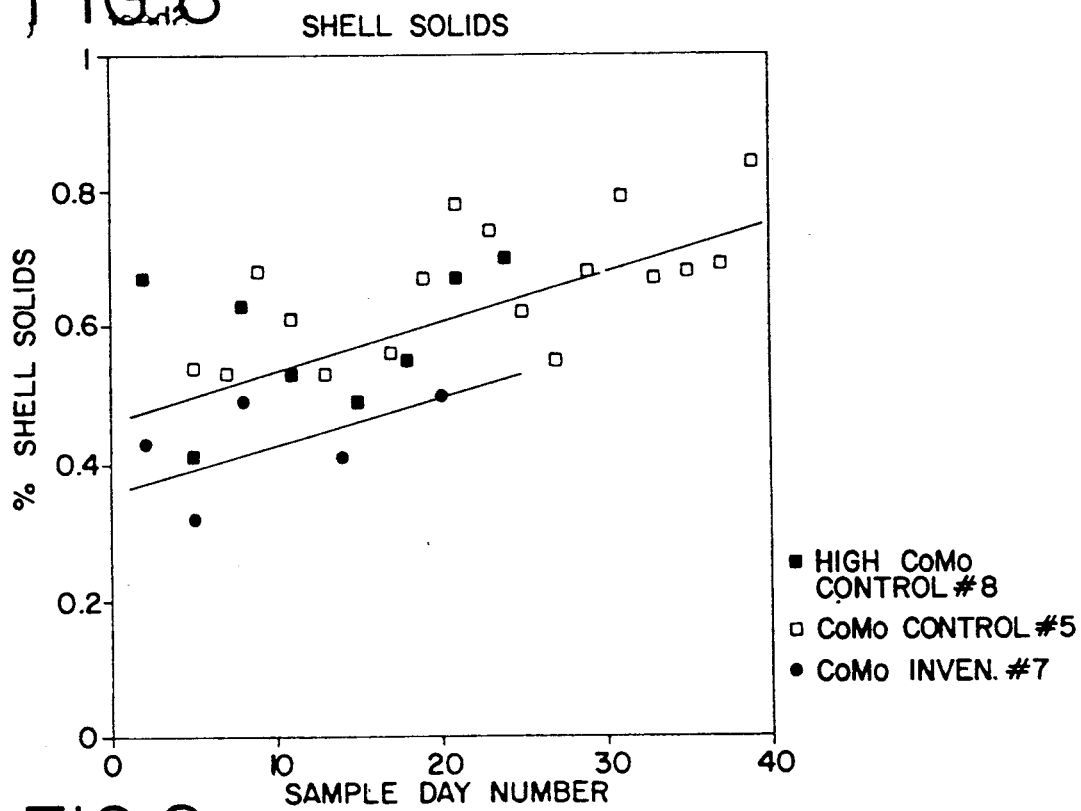
FIG. 8 is a plot of percentage Shell hot filtration solids versus time for catalysts tested in Examples 10, 11, and 12.

FIG. 8 shows that Catalyst 7 (CoMo invention) in Example 12 has lower Shell solids compared with Catalyst 8 (high CoMo control) in Example 10 and Catalyst 5 (CoMo control) in Example 11. The significance here is that Catalyst 7 (CoMo invention) in Example 12 and Catalyst 8 (high CoMo control) in Example 10 both had similar values for pore volumes greater than about 600 Angstroms radius, but different values for average pore radius in pore having radii greater than about 600 Angstroms (See Table 8), yet Shell solids are lower for Catalyst 7 (CoMo invention). This is in contradistinction to teachings in U.S. Pat. No. 4,746,419 (Peck et al.) that pores having radii less then 600 Angstroms have no effect on mitigating Shell solids formation.

Figure 9:
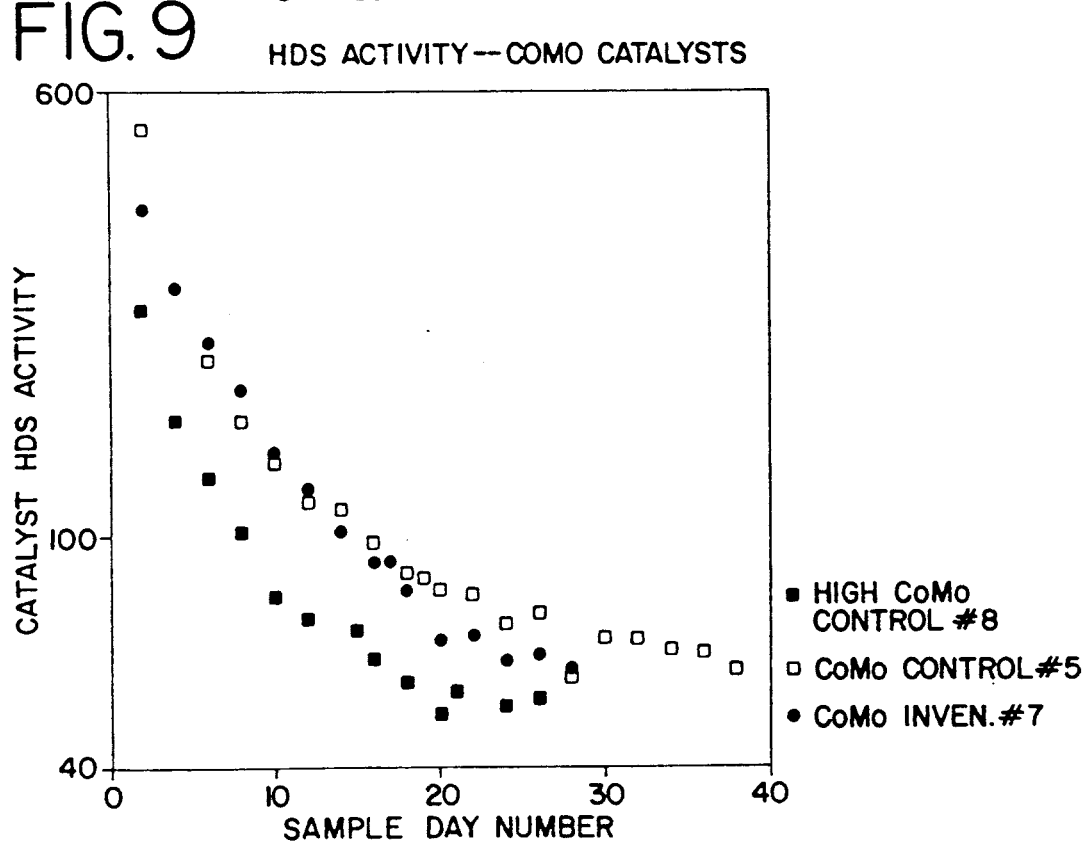
FIG. 9 is a plot of hydrodesulfurization activities versus time for catalysts tested in Examples 10, 11, and 12.

FIGS. 9-11 show that Catalyst 7 (CoMo invention) in Example 12 had volumetric activities for HDS, Ramscarbon and HDN, respectively, that were similar to those for the Catalyst 5 (CoMo control) in Example 11 and exceeded those for Catalyst 8 (high CoMo control) in Example 10. Moreover, Table 8 shows that the bulk density of Catalyst 7 (CoMo invention) was about 10% lower than the bulk density of Catalyst 5 (CoMo control). Thus, the reported activities can be achieved with less weight of catalyst and potentially lower catalyst cost using Catalyst 7 (CoMo invention).

Table 12 below, shows that the product quality of the distilled naphtha, distillate, gas oil and resid fractions obtained from Catalyst 7 (CoMo invention) in Example 12 was comparable to or exceeded that from Catalyst 8 (high CoMo control) in Example 10 or Catalyst 5 (CoMo control) in Example 11.

TABLE 12

Distilled Product Quality After 24
Days on Resid (Examples 10-12) Feed A

| Example No. | Feed A | 10 | 11 | 12 |
|---|---|---|---|---|
| Naphtha, vol % | 0.0 | 6.7 | 6.9 | 6.3 |
| Gravity, °API | | 55.9 | 55.0 | 55.6 |
| Nitrogen, ppm | | 250 | 214 | 175 |
| Sulfur, wt % | | .050 | .065 | .049 |
| Distillate, vol % | 8.1 | 26.4 | 28.5 | 28.0 |
| Gravity, °API | | 27.4 | 27.9 | 27.5 |
| Nitrogen, ppm | | 1100 | 1000 | 1020 |
| Sulfur, wt % | | .207 | .099 | .114 |
| Gas Oil, vol % | 28.0 | 44.6 | 47.1 | 47.3 |
| Gravity, °API | | 15.0 | 15.3 | 15.3 |
| Nitrogen, wt % | | .27 | .28 | .29 |
| Sulfur, wt % | | .71 | .50 | .60 |
| % $C_A$, NMR | | 30.9 | 30.3 | 29.7 |
| Resid, vol % | 63.9 | 24.1 | 21.0 | 22.0 |
| Gravity, °API | 5.0 | 4.6 | 4.4 | 5.7 |
| Nitrogen, wt % | .614 | .64 | .75 | .71 |
| Sulfur, wt % | 3.60 | 1.43 | 1.28 | 1.33 |
| RAMSCARBON wt % | 20.3 | 24.2 | 25.4 | 23.5 |
| H/C (molar) | — | 1.37 | 1.35 | 1.37 |
| Ni, ppm | 66 | 35 | 41 | 34 |
| V, ppm | 267 | 23 | 28 | 22 |
| Fe, ppm | 4 | <2 | <2 | 4 |

SUMMARY OF EXAMPLES 13-15

In Examples 13-15, the reactor configuration consisted of Units 1, 2, and 3 type reactors. The catalyst in each configuration was loaded so that the T/C ratio after loading was about one. Start-up and process conditions including the feed were the same as Example 10.

EXAMPLE 13

In Example 13, the reactor consisted of two fixed-bed Unit 3 type reactors in series, each having a ⅜ inch I. D. Reactor 1 was loaded with 13 cc of Catalyst 6 (low CoMo control) and mixed with 16 cc of non-porous alpha-alumina diluent sized to 14/20 mesh. Reactor 2 was loaded with 7 cc of Catalyst 6 (low CoMo control) and 7 cc of diluent.

EXAMPLE 14

In Example 14, the reactor consisted of a single fixed-bed Unit 2 type reactor having a ⅜ inch I.D. Catalyst 9 (NiMo control) which had the physical properties shown in Table 8 was used.

EXAMPLE 15

In Example 15, the reactor consisted of a single fixed bed Unit 1 type reactor having a ⅜ inch I.D. Catalyst 10 (NiMo invention) which had the physical properties shown in Table 8 was used.

DISCUSSION OF EXAMPLES 13-15

FIGS. 12-14 show that the volumetric activities for HDN, HDC and HDS for Catalyst 10 (NiMo invention) of Example 15 were comparable to or exceeded those activities for catalyst 6 (low CoMo control) of Example 13 and Catalyst 9 (NiMo control) of Example 14. Moreover, the bulk density of Catalyst 10 (NiMo invention) was about 10% lower than Catalyst 9 (NiMo control), as noted in Table 8. Thus, equal or improved unit performance may be achieved at potentially lower catalyst cost using Catalyst 10 (NiMo invention).

Table 13 shows that the product quality of the distilled naphtha, distillate, gas oil and resid product fractions obtained from the Catalyst 10 (NiMo invention) in Example 15 was comparable to or exceeded that from Catalyst 6 (low CoMo control) in Example 13 or Catalyst 9 (NiMo control) in Example 14.

TABLE 13

Distilled Product Quality After 24 Days on Resid (Examples 13-15) Feed A

| Example No. | Feed A | 13 | 14 | 15 |
|---|---|---|---|---|
| Naphtha, vol % | 0.0 | 6.0 | 4.5 | 6.5 |
| Gravity, °API | | 55.6 | 54.2 | 54.9 |
| Nitrogen, ppm | | 325 | 373 | 353 |
| Sulfur, wt % | | .066 | .125 | .061 |
| Distillate, vol % | 8.1 | 29.2 | 27.7 | 27.6 |
| Gravity, °API | | 26.3 | 25.8 | 28.5 |
| Nitrogen, ppm | | 1290 | 1330 | 1055 |
| Sulfur, wt % | | .266 | .161 | .124 |
| Gas Oil, vol % | 28.0 | 44.0 | 45.5 | 45.6 |
| Gravity, °API | | 15.1 | 15.7 | 15.5 |
| Nitrogen, wt % | | .316 | .31 | .31 |
| Sulfur, wt % | | .68 | .49 | .56 |
| % C₄, NMR | | 30.4 | 29.0 | 31.0 |
| Resid, vol % | 63.9 | 24.1 | 26.0 | 23.4 |
| Gravity, °API | 5.0 | 5.9 | 6.0 | 5.2 |
| Nitrogen, wt % | .614 | .63 | .65 | .74 |
| Sulfur, wt % | 3.60 | 1.29 | 1.24 | 1.35 |
| RAMSCARBON wt % | 20.3 | 23.7 | 21.3 | 24.5 |
| H/C (molar) | — | 1.39 | 1.41 | 1.35 |
| Ni, ppm | 66 | 31 | 42 | 44 |
| V, ppm | 267 | 15 | 27 | 31 |
| Fe, ppm | 4 | <2 | <2 | <2 |

EXAMPLE 16

Examples 16 and 17 represent catalyst tests under the same conditions as in Examples 4. Example 16 was carried out under the same conditions as Example 4, except that Catalyst 9 (NiMo control) was placed in Beds 2 and 3. Feed A was processed in Examples 16 and 17.

EXAMPLES 17

Example 17 was similar to Example 16 except that Catalyst 11 (NiMoP invention) was placed in Beds 2 and 3.

DISCUSSION OF EXAMPLES 5, 16 and 17

FIGS. 15 and 16 show that the invention Catalyst 11 (NiMoP invention) of Example 17 had HDS and HDN activites, respectively, that were comparable to or exceeded that for Catalyst 9 (NiMo control) of Example 16 and Catalyst 6 (low CoMo control) of Example 5. Table 14 shows moderately improved product quality in all distilled product fractions for Catalyst 11 (NiMoP invention) of Example 17 compared with either Catalyst 9 (NiMo control) of Example 16 or Catalyst 6 (low CoMo control) of Example 5.

TABLE 14

Distilled Product Quality After 25-30 Days on Resid (Examples 16, 17) Feed A

| Example No. | 16 Day 26-31 | 17 Day 27-31 |
|---|---|---|
| Naphtha, vol % | 7.51 | 11.0 |
| Gravity, °API | 9.6 | 57.7 |
| Nitrogen, ppm | 130 | 103 |
| Sulfur, wt % | .045 | .047 |
| Distillate, vol % | 39.3 | 34.6 |
| Gravity, °API | 30.2 | 31.1 |
| Nitrogen, ppm | 1160 | 885 |
| Sulfur, wt % | .021 | .021 |
| Gas Oil, vol % | 44.9 | 47.6 |
| Gravity, °API | 16.0 | 16.7 |
| Nitrogen, wt % | .322 | .294 |
| Sulfur, wt % | .270 | .228 |
| % C₄, NMR | 31.0 | 29.7 |
| Mass Spec. vol % | | |
| Total Aromatics | 45.5 | 45.4 |
| Mono - | 15.4 | 16.5 |
| Di+ | 30.1 | 28.9 |
| Resid, vol % | 10.5 | 11.8 |
| Gravity, °API | 1.8 | 4.3 |
| Nitrogen, wt % | .768 | .698 |
| Sulfur, wt % | .68 | .60 |
| % C₄, NMR | 47.3 | 44.5 |
| RAMSCARBON, wt % | 30.6 | 27.6 |
| H/C (molar) | 1.244 | 1.404 |
| Ni, ppm | 35 | 24 |
| V, ppm | 2 | <2 |
| Fe, ppm | <2 | <2 |

EXAMPLE 18

All runs were carried out in an ebullated reactor loaded with 110 cc of fresh catalyst. Complete backmixing of the liquid was achieved by internal liquid recycle. Thermal to catalytic ratio (T/C) was about 1.2, or close to commercial operation. Run conditions were: 800° F., 1800 psig, 0.33 LHSV, 10,000 SCFB H₂. Runs were carried out for 10-20 days.

The feed was a commercially blended vacuum resid hydrotreater feed with high metals, Ramscarbon, sulfur and nitrogen content and with minimal diluent. The severity was such that conversions matched that of an entire reside hydrotreater train in a single stage. This was to test activities with a feed containing large amounts of catalyst fouling contaminants simulating the operation of an entire train. Feed properties are in Table 15.

TABLE 15

| | Feed Properties | |
|---|---|---|
| Example | 18 | 19, 21 |
| sp.gr. 60/60° F. | 1.020 | 0.982 |
| Ni, ppm | 57 | 15 |
| V, ppm | 254 | 32 |
| S, wt % | 4.6 | 2.87 |
| N, wt % | 0.49 | 0.36 |
| C, wt % | 84.05 | 85.53 |
| H, wt % | 10.20 | 10.55 |
| Ramscarbon, wt % | 18.6 | 7.73 |
| wt % feed | | |
| 360-650° F. | 0.0 | 3.5 |
| 650-1000° F. | 22.0 | 62.5 |
| 1000° F. | 78.0 | 34.0 |

Catalysts used in Example 18 had the properties shown below in Table 16.

TABLE 16

| | Catalyst Properties | | | | | | | | |
|---|---|---|---|---|---|---|---|---|---|
| | Metals | | wt % | BET SA | N2 PV | 2V/A | Hg PV | CBD*** | Attm | Diameter |
| ID | CoO | NiO | MoO3 | m2/g | cc/g | A | cc/g | lb/ft.3 | wt. % | in. |
| 12 | — | 3.6 | 13.6 | 295 | 0.56 | 38 | 0.18 | 34.5 | 2.4 | 1/25 |
| 13 | — | 3.9 | 13.5 | 222 | 0.77 | 70 | 0.24 | 29.4* | — | 1/20 |
| 14 | — | 4.0 | 13.7 | 257 | 0.69 | 53 | 0.24 | 31.0 | 2.8 | 1/20 |
| 15 | 3.8 | — | 13.6 | 300 | 0.64 | 42 | 0.20 | 36.1 | 1.3 | 1/25 |
| 16 | 3.9 | — | 14.1 | 282 | 0.70 | 50 | 0.26 | 30.6 | 1.5 | 1/20 |
| 17 | 0.8 | — | 4.6 | 205 | 0.79 | 77 | 0.29 | 28.7 | 2.8** | 1/20 |

*approximate value obtained from 50 g sample rather than standard 150 g
**carbon added to attrition mill to prevent static cling - lowers attrition number obtained.
***compacted bulk density by ASTM method Catalyst 12 was a high surface area, NiMo, commercially available control catalyst. Catalyst 13 was a low surface area NiMo invention catalyst. Catalyst 14 was a high surface area NiMo invention catalyst. Catalyst 15 was a commercially available CoMo control catalyst. Catalyst 16 was a CoMo invention catalyst. Catalyst 17 was a commercially available CoMo catalyst. As shown in Table 16, Catalyst 13 (low surface area NiMo invention) and Catalyst 14 (high surface area NiMo invention) have intermediate pore volumes and compacted bulk density between Catalyst 12 (high surface area NiMo control) and Catalyst 17 (CoMo control). Catalyst 12 (high surface area NiMo control), Catalyst 13 (low surface area NiMo invention), and Catalyst 14 (high surface area NiMo invention) contained catalyst promoters, while Catalyst 17 (CoMo control) contained less than a theoretical monolayer of promoter metals.

The relative incremental pore volume distribution plots for Catalysts 12-17 are shown in 17 and 18.

Figure 19:
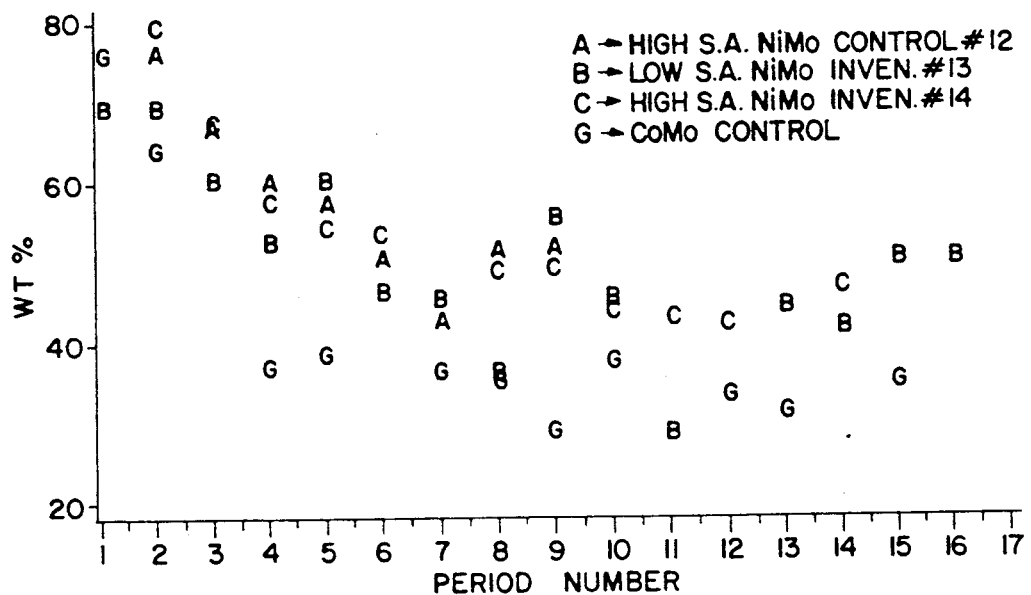
FIG. 19 is a plot of denitrogenation activities versus time for catalysts tested in Example 18.
Figure 20:
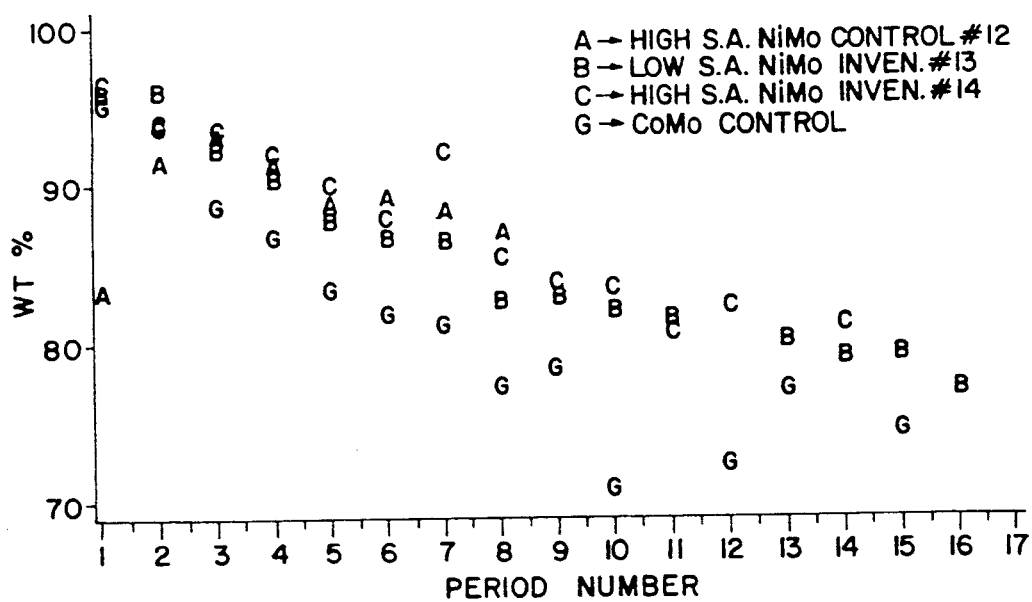
FIG. 20 is a plot of hydrodesulfurization activities versus time for catalysts tested in Example 18.
Figure 21:
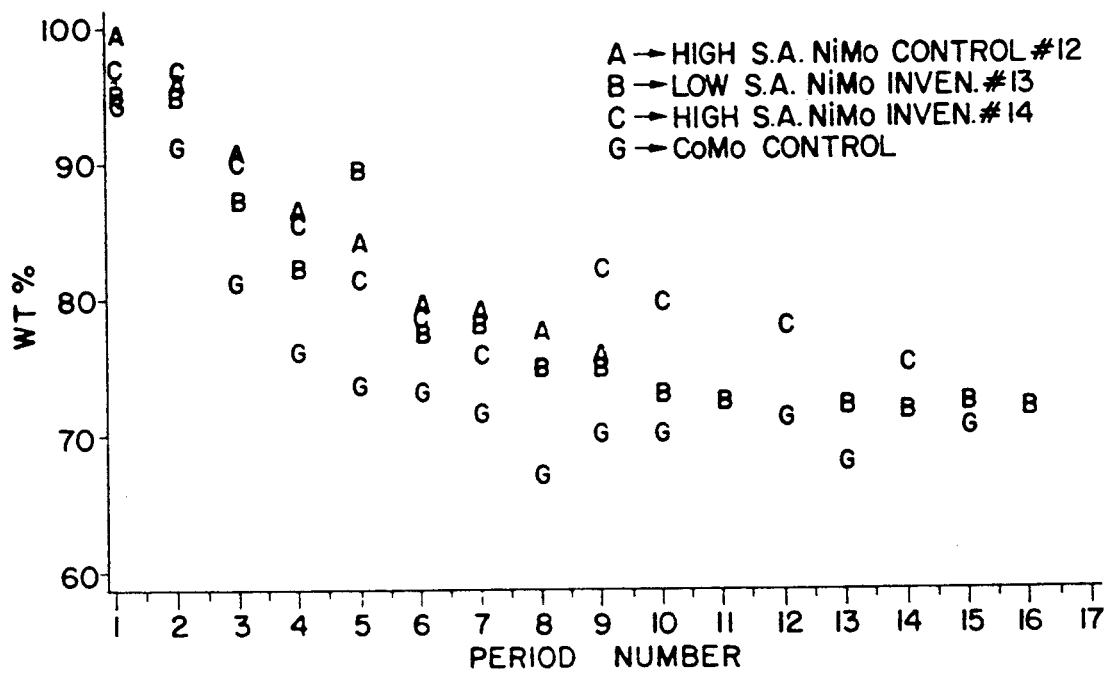
FIG. 21 is a plot of Ramscarbon removal activities versus time for catalysts tested in Example 18.
Figure 22:
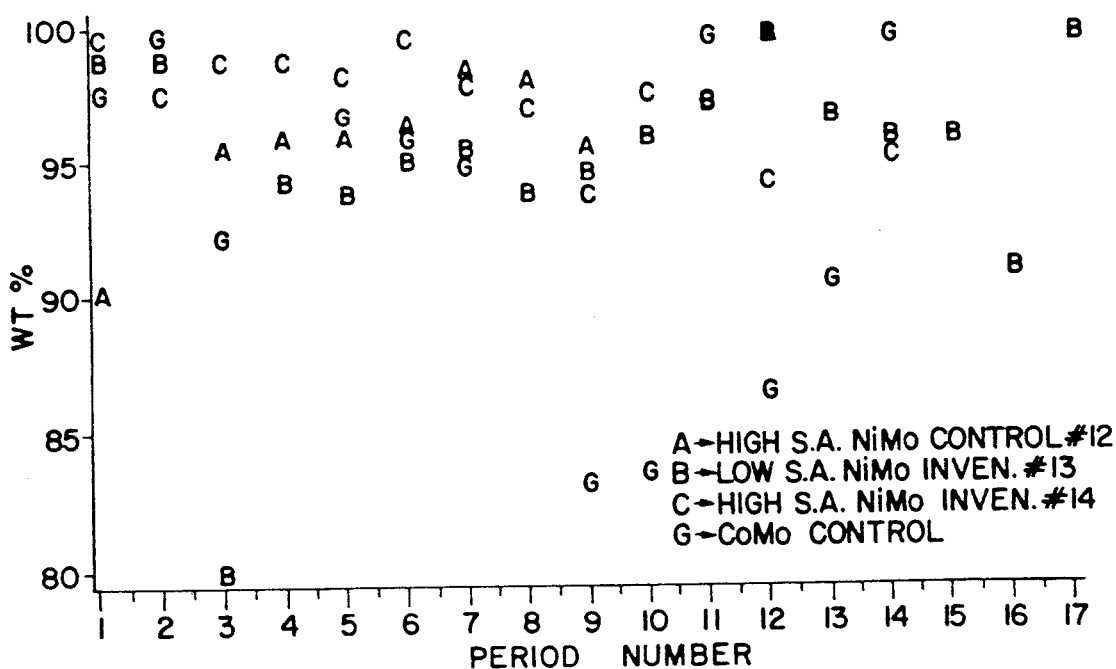
FIG. 22 is a plot of devanadation activities versus time for catalysts tested in Example 18.
Figure 23:
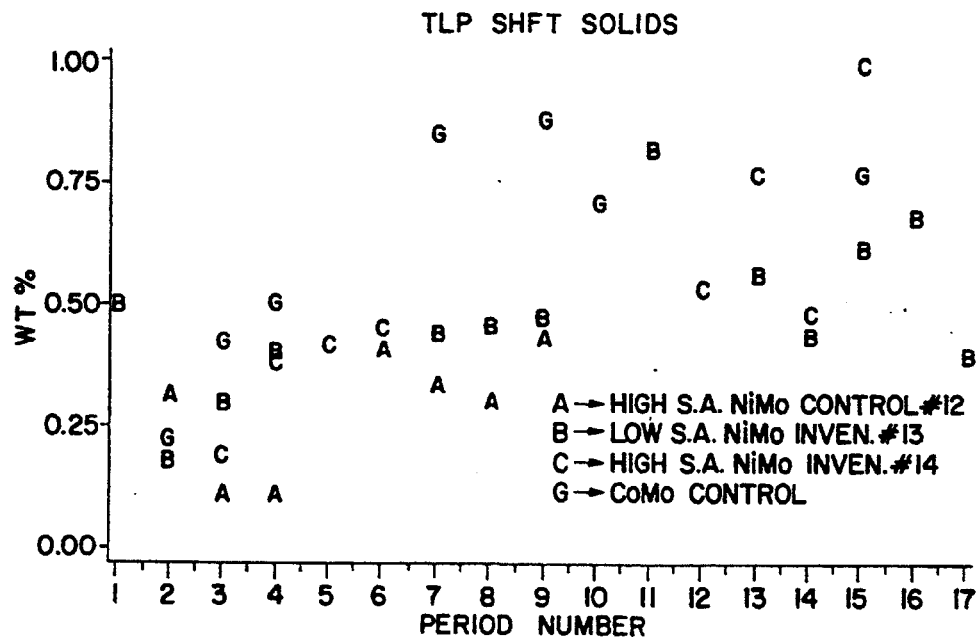
FIG. 23 is a plot of percentage Shell hot filtration solids versus time for catalysts tested in Example 18.

FIGS. 19-21 show that Catalyst 13 (low surface area NiMo invention) and Catalyst 14 (high surface area NiMo inventions) performed at least as well as Catalyst 12 (high surface area NiMo control) and better than Catalyst 17 (CoMo control) for HDN, HDS, and Ramscarbon removal. FIG. 22 shows that demetallation was better for Catalyst 14 (high surface area NiMo invention) than either control catalyst, while Catalyst 13 (low surface area NiMo invention) was essentially the same as the control catalysts. FIG. 23 shows that Shell hot filtration solids formation was at least as low for the invention catalysts as Catalyst 12 (NiMo control), and better than Catalyst 17 (CoMo control). On a volume basis, the invention catalysts were better then Catalyst 12 (NiMo control), due to their lower density, and better than Catalyst 17 (CoMo control) based on absolute performance.

EXAMPLE 19

All runs were carried out in an ebullated bed reactor loaded with 110 cc of fresh catalyst. Complete backmixing of the liquid was achieved by internal liquid recycle. Thermal to catalytic ratio (T/C) was about 1.2, or close to commercial operation. Run conditions were: 800 F., 1800 psig, 0.54 LHSV, 5000 scfb H2. Runs were carried out for 15-30 days.

The feed was a synthetic blend created to simulate the feed to the second or third stage of a resid hydrotreating unit. It was designed to test activities in the absence of significant metals loading effects but with a stable hydrotreated component to the feed. The feed was prepared by blending 650 F+ material from West Texas crude, resid hydrotreater HVGO, and decanted oil. Feed properties are in Table 15.

The catalysts tested in this experiment were the same as Catalyst 12 (NiMo control), Catalyst 13 (low surface area NiMo invention), and Catalyst 14 (high surface area NiMo).

Figure 24:
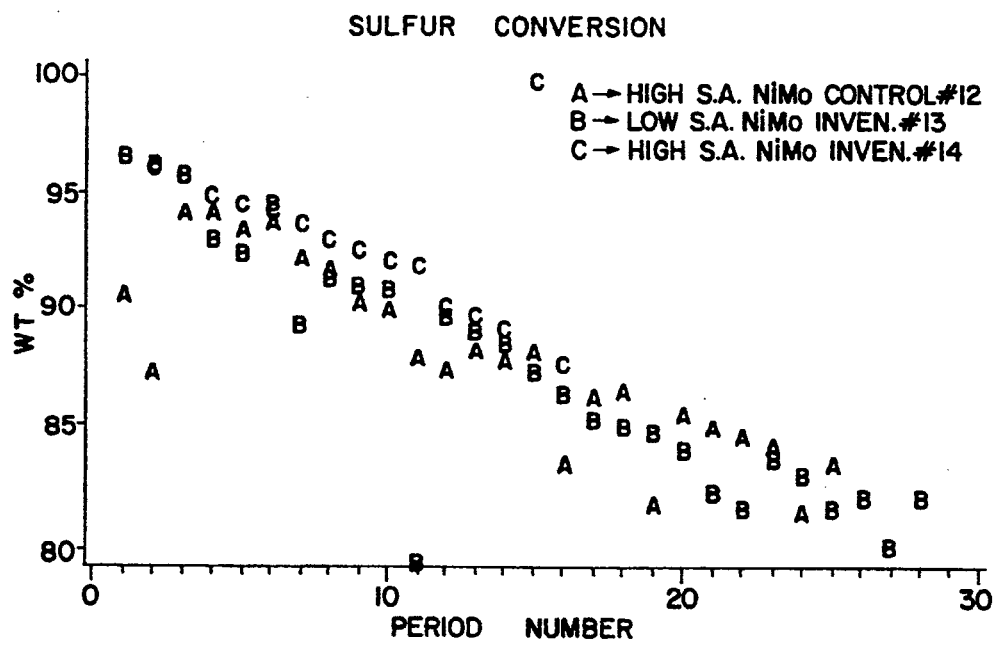
FIG. 24 is a plot of hydrodesulfurization activities versus time for catalysts tested in Example 19.
Figure 25:
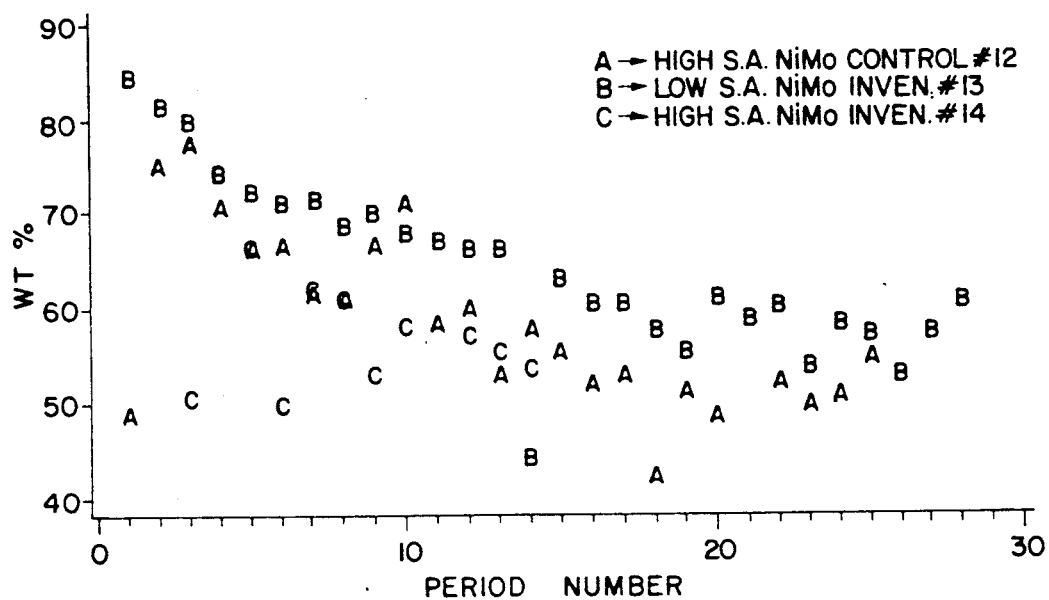
FIG. 25 is a plot of denitrogenation activities versus time for catalysts tested in Example 19.
Figure 26:
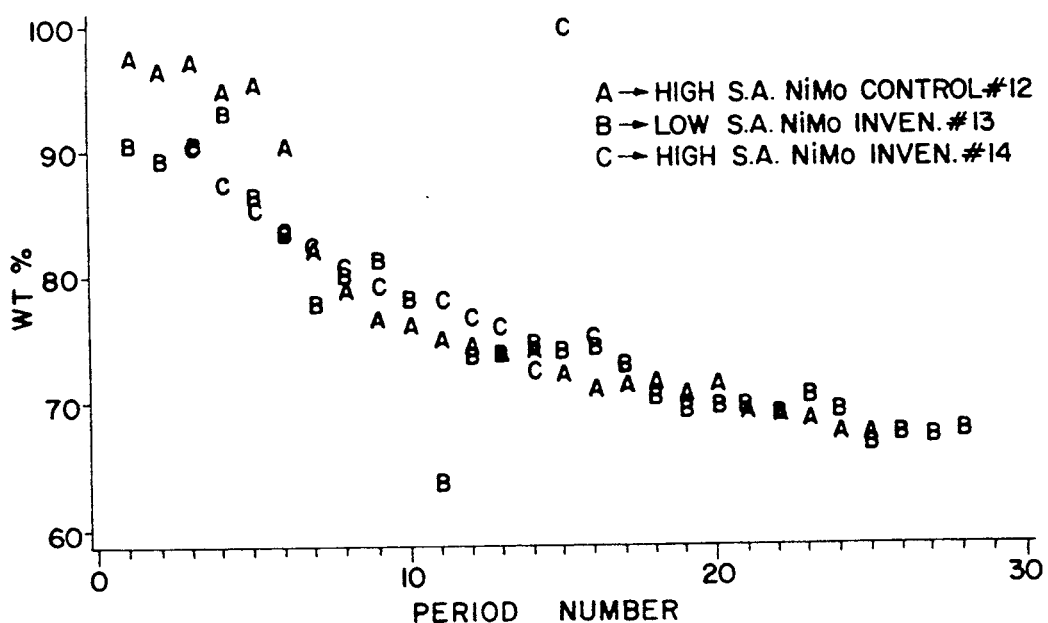
FIG. 26 is a plot of Ramscarbon removal activities versus time for catalysts tested in Example 19.
Figure 27:
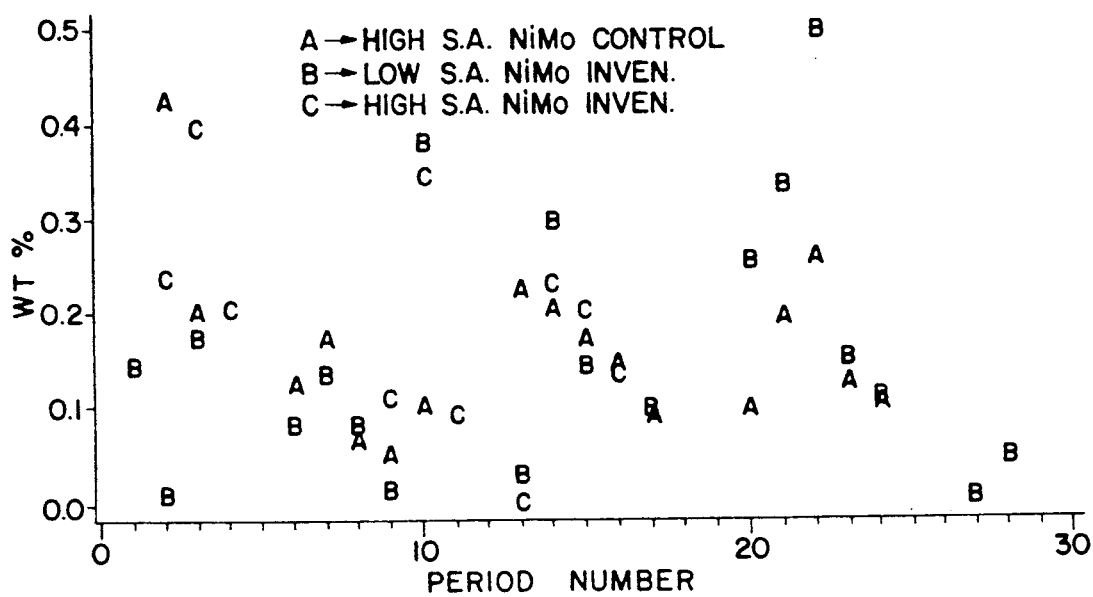
FIG. 27 is a plot of percentage Shell hot filtration solids versus time for catalysts tested in Example 19.
Figure 28:
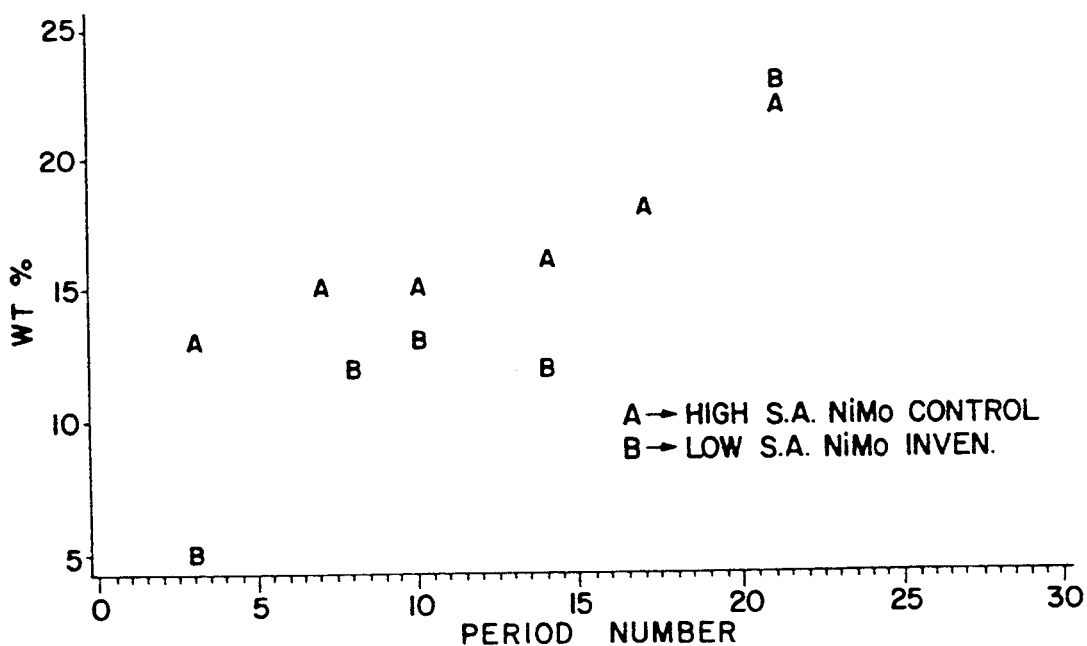
FIG. 28 is a plot of vanadium and nickel removal activities versus time for catalysts tested in Example 19.
Figure 29:
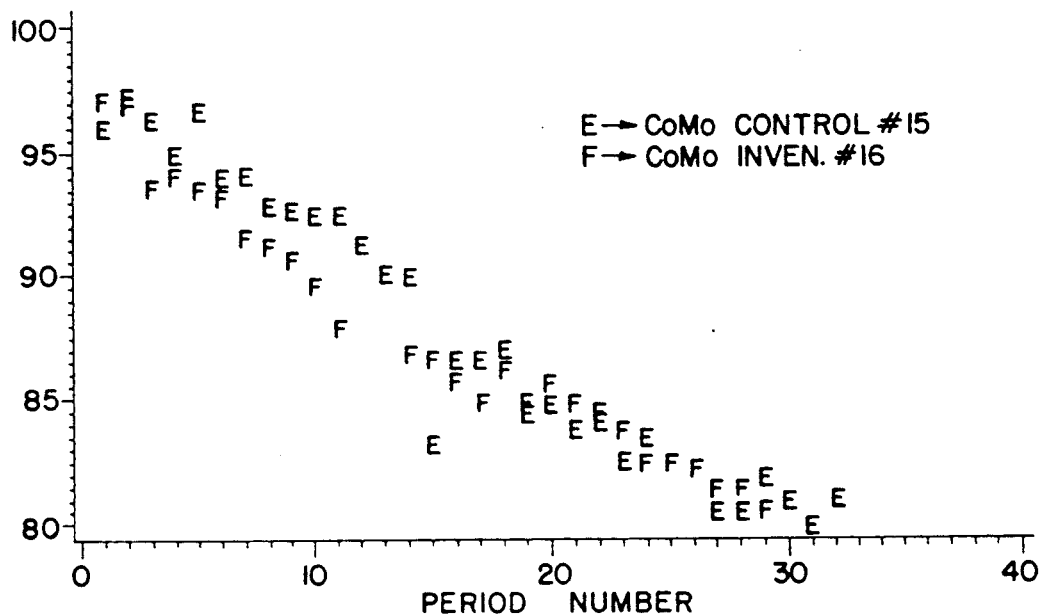
FIG. 29 is a plot of hydrodesulfurization activities versus time for catalysts tested in Example 20.
Figure 30:
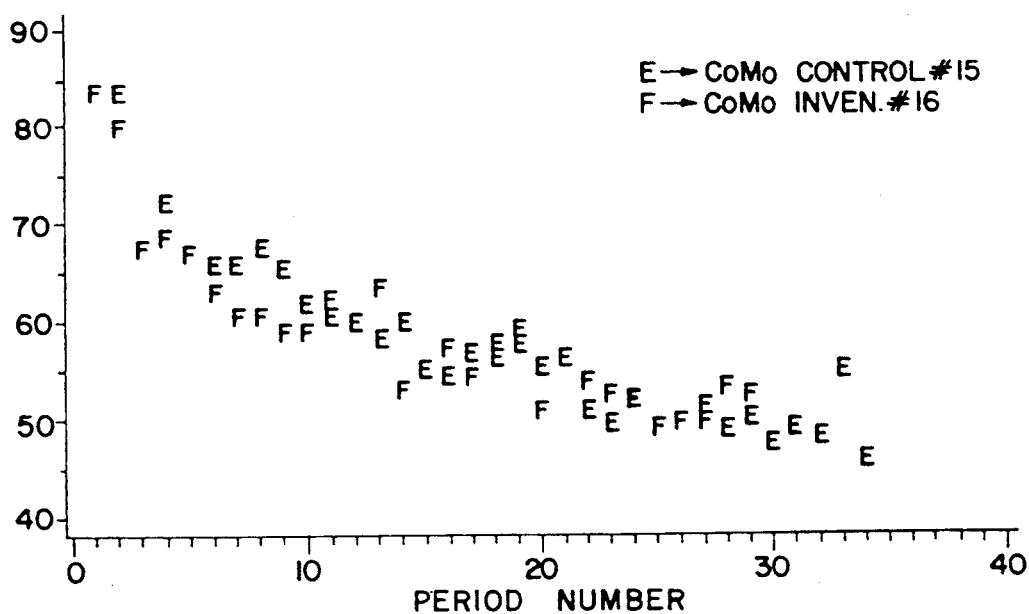
FIG. 30 is a plot of denitrogenation activities versus time for catalysts tested in Example 20.
Figure 31:
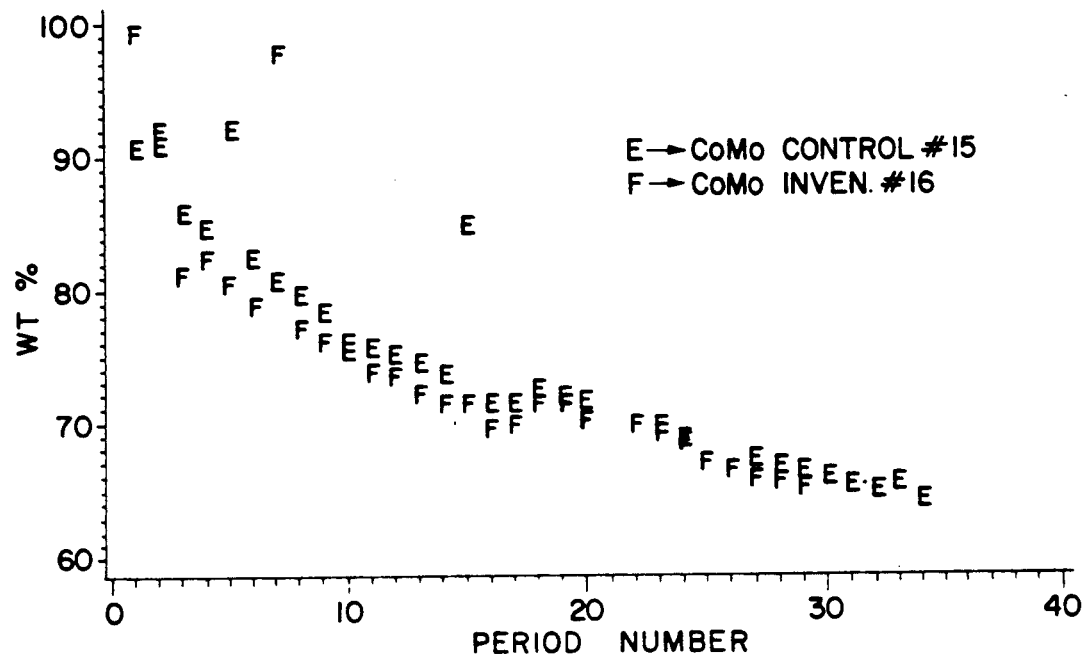
FIG. 31 is a plot of Ramscarbon removal activities versus time for catalysts tested in Example 20.
Figure 32:
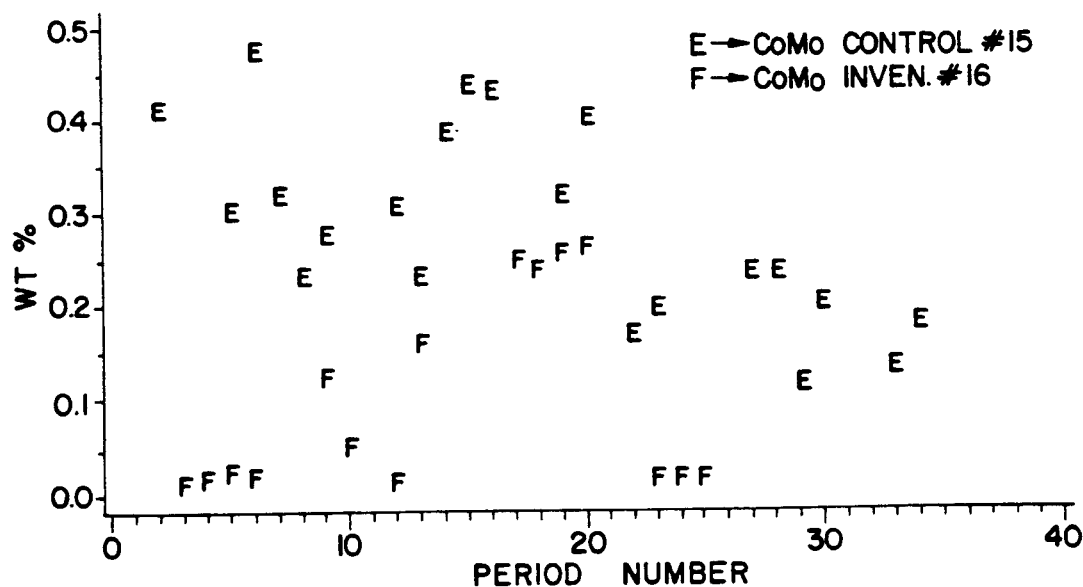
FIG. 32 is a plot of percentage Shell hot filtration solids versus time for catalysts tested in Example 20.

FIGS. 24-26 show that the invention catalysts perform at least as well as the control catalyst for HDS, HDN, and Ramscarbon removal. HDN, in fact was much better for Catalyst 13 (low surface area NiMo invention) than Catalyst 12 (NiMo Control). FIG. 27 illustrates that Shell hot filtration solids formation was as least as low for the invention catalysts as the control. FIG. 28 illustrates that metals removal from the resid was better for the invention catalysts. On a volume basis, the invention catalysts were better than the control due to their lower density.

EXAMPLE 20

Both runs were carried out in an ebullated bed recycle reactor loaded with 110 cc of fresh catalyst. Complete backmixing of the liquid was achieved by internal liquid recycle. Thermal to catalytic ratio (T/C) was about 1.0, or close to commercial operation. (This reactor is slightly different from the one used in Examples 18 and 19, accounting for the T/C difference. Direct comparisons for sulfur, nitrogen and metals removal with Example II are valid, but not deRamscarbon or SHFT solids). Run conditions were: 800 F, 1800 psig, 0.54 LHSV, 5000 scfb H2. Runs were carried out for 30+ days.

The feed was the same as that used in Example 19.

The catalysts tested were the same as Catalyst 15 (CoMo control) and Catalyst 16 (CoMo invention).

FIGS. 28-32 show that Catalyst 16 (CoMo invention) performed comparably to the control for HDS, HDN and Ramscarbon removal, but produce significantly less Shell hot filtration solids and removed V and Ni from the resid better. Due to its lighter density, the invention catalyst has a higher activity per pound than the control for all functions.

We claim:

1. A hydroprocessing catalyst comprising at least one hydrogenation metal selected from the group consisting of the Group VIB metals and the Group VIII metals deposited on an inorganic oxide support, said catalyst being characterized by a surface area of greater than about 220 $m^2/g$, a pore volume of 0.23-0.30 cc/g in pores greater than about 600 Angstroms, an average pore radius of about 30-70 Angstroms in pores less than about 600 Angstroms, and an incremental pore volume curve with a maximum at about 25-50 Angstroms radius.

2. A catalyst of claim 1 wherein said maximum is about 0.5-1.2 cc/g.

3. A catalyst of claim 1 wherein the hydrogenation metal is at least one member selected from the group consisting of Fe, Co, Ni, Ru, Rh, Pd, Os, Ir, Cr, Mo, W and Pt.

4. A catalyst of claim 3 wherein the hydrogenation metals are Co and Mo.

5. A catalyst of claim 3 wherein the hydrogenation metals are Ni and Mo.

6. A catalyst system for hydroprocessing a hydrocarbon feedstock comprising a first zone containing a first catalyst comprising: at least one metal deposited on an inorganic oxide support, said first catalyst being characterized by a surface area of less than about 200 $m^2/g$, a pore volume of about 0.23-0.30 cc/g in pores greater than about 600 Angstroms in radius, an average pore radius of about at least about 70 Angstroms in pores less than about 600 Angstroms, and an incremental pore volume peak with a maximum greater than about 25-50 Angstroms; and a second zone containing a second catalyst comprising at least one hydrogenation metal selected from the group consisting of the Group VIB metals and the Group VIII metals deposited on an inorganic oxide support, said second catalyst being characterized by a surface area of greater than about 220 $m^2/g$, a pore volume of 0.23-0.30 cc/g in pores greater than 600 Angstroms radius, an average pore radius of about 30-70 Angstroms in pores less than about 600 Angstroms radius, and an incremental pore volume curve with a maximum at about 25-50 Angstroms radius.

7. A catalyst system of claim 6 wherein said maximum is about 0.5-1.2 cc/g.

8. A catalyst system of claim 6 wherein said hydrogenation metal is at least one member selected from the group consisting of Fe, Co, Ni, Ru, Rh, Pd, Os, Ir, Cr, Mo, W and Pt.

9. A catalyst system of claim 8 wherein said hydrogenation metals are Co and Mo.

10. A catalyst system of claim 8 wherein said hydrogenation metals are Ni and Mo.

* * * * *